(12) United States Patent
Blume

(10) Patent No.: US 9,036,082 B2
(45) Date of Patent: May 19, 2015

(54) METHOD, APPARATUS, AND SYSTEM FOR LINE-BASED MOTION COMPENSATION IN VIDEO IMAGE DATA

(75) Inventor: Volker Blume, Tangstedt (DE)

(73) Assignee: NXP, B.V., Eindhoven (NL)

( * ) Notice: Subject to any disclaimer, the term of this patent is extended or adjusted under 35 U.S.C. 154(b) by 1255 days.

(21) Appl. No.: 12/676,364

(22) PCT Filed: Aug. 22, 2008

(86) PCT No.: PCT/IB2008/053373
§ 371 (c)(1),
(2), (4) Date: Jul. 12, 2010

(87) PCT Pub. No.: WO2009/034492
PCT Pub. Date: Mar. 19, 2009

(65) Prior Publication Data
US 2010/0277644 A1    Nov. 4, 2010

(30) Foreign Application Priority Data
Sep. 10, 2007 (EP) .................................... 07017665

(51) Int. Cl.
H04N 7/01       (2006.01)
G06T 7/20       (2006.01)

(52) U.S. Cl.
CPC ............ *H04N 7/0132* (2013.01); *G06T 7/2033* (2013.01); *G06T 2207/10016* (2013.01); *H04N 7/014* (2013.01)

(58) Field of Classification Search
USPC ..................................................... 375/240.16
See application file for complete search history.

(56) References Cited

U.S. PATENT DOCUMENTS 5,173,771 A * 12/1992 Kitazato .................. 375/240.16
5,327,232 A *  7/1994 Kim .......................... 375/240.14

(Continued)

FOREIGN PATENT DOCUMENTS

| | | |
|---|---|---|
| EP | 0 765 572 B1 | 6/2000 |
| EP | 1 884 893 A1 | 2/2008 |
| GB | 2 401 502 A | 11/2004 |

OTHER PUBLICATIONS

Ojo, Anthony Olukayode, et al; "Robust Motion-Compensated Video Upconversion"; 19971101; vol. 43, No. 4; Nov. 1, 1997; pp. 1045-1056.

(Continued)

*Primary Examiner* — Dave Czekaj
*Assistant Examiner* — Kehinde O Abimbola

(57) ABSTRACT

The present invention is related to line-based motion estimation and compensation in video image data. In particular, by performing the line-based motion estimation, a set of motion vectors for the line-based motion compensation is provided. By use of the provided set of motion vectors, the line-based motion compensation is performed by interpolating the image data of the current field/frame, wherein an interpolated image data of the image data of the current field/frame is provided as result of the performing of the line-based motion compensation. Then, it is checked, whether a region of the interpolated image data of the current field/frame comprises at least one pixel of the region, which was interpolated according to a motion vector from the set of motion vectors, which is indicated as being not reliable for the line-based motion compensation. If so, a blurring of the corresponding region is performed according to the present invention.

38 Claims, 12 Drawing Sheets

(56) References Cited

U.S. PATENT DOCUMENTS

| | | | |
|---|---|---|---|
| 6,034,734 A * | 3/2000 | De Haan et al. | 348/458 |
| 6,192,079 B1 * | 2/2001 | Sharma et al. | 375/240.16 |
| 6,240,211 B1 * | 5/2001 | Mancuso et al. | 382/236 |
| 6,274,299 B1 * | 8/2001 | Buhr et al. | 430/359 |
| 6,438,275 B1 * | 8/2002 | Martins et al. | 382/300 |
| 6,456,337 B1 * | 9/2002 | Kobayashi et al. | 348/701 |
| 6,611,562 B1 * | 8/2003 | Kondo et al. | 375/240.27 |
| 6,647,061 B1 * | 11/2003 | Panusopone et al. | 375/240.12 |
| 6,671,322 B2 * | 12/2003 | Vetro et al. | 375/240.16 |
| 6,710,844 B2 * | 3/2004 | Han et al. | 352/44 |
| 6,728,317 B1 * | 4/2004 | Demos | 375/240.21 |
| 6,898,241 B2 * | 5/2005 | Vetro | 375/240.12 |
| 7,079,159 B2 * | 7/2006 | Yang | 345/684 |
| 7,088,780 B2 * | 8/2006 | Vetro et al. | 375/240.02 |
| 7,170,932 B2 * | 1/2007 | Vetro et al. | 375/240 |
| 7,274,402 B2 * | 9/2007 | Hahn | 348/441 |
| 7,324,160 B2 * | 1/2008 | Yang | 348/542 |
| 7,330,509 B2 * | 2/2008 | Lu et al. | 375/240.03 |
| 7,408,987 B1 * | 8/2008 | Chevance et al. | 375/240.16 |
| 7,590,179 B2 * | 9/2009 | Mukerjee | 375/240.15 |
| 7,620,254 B2 * | 11/2009 | Hahn et al. | 382/236 |
| 7,623,576 B1 * | 11/2009 | Hui et al. | 375/240.26 |
| 7,643,657 B2 * | 1/2010 | Dufaux et al. | 382/115 |
| 7,667,773 B2 * | 2/2010 | Han | 348/452 |
| 7,904,814 B2 * | 3/2011 | Errico et al. | 715/725 |
| 7,924,920 B2 * | 4/2011 | Hsu et al. | 375/240.15 |
| 7,925,120 B2 * | 4/2011 | Lee | 382/305 |
| 7,929,609 B2 * | 4/2011 | Riemens et al. | 375/240.16 |
| 7,933,332 B2 * | 4/2011 | Schu et al. | 375/240.16 |
| 7,978,770 B2 * | 7/2011 | Luo et al. | 375/240.16 |
| 8,144,778 B2 * | 3/2012 | Jia et al. | 375/240.16 |
| 8,160,144 B1 * | 4/2012 | Varadarajan et al. | 375/240.16 |
| 8,170,106 B2 * | 5/2012 | Hattori et al. | 375/240.16 |
| 8,401,070 B2 * | 3/2013 | Jia et al. | 375/240.01 |
| 8,428,125 B2 * | 4/2013 | Oguz | 375/240.08 |
| 2003/0016751 A1 * | 1/2003 | Vetro et al. | 375/240.16 |
| 2003/0086498 A1 * | 5/2003 | Lee et al. | 375/240.16 |
| 2004/0101047 A1 * | 5/2004 | Yang | 375/240.08 |
| 2005/0084011 A1 * | 4/2005 | Song et al. | 375/240.12 |
| 2005/0238101 A1 * | 10/2005 | Schu et al. | 375/240.16 |
| 2006/0018381 A1 * | 1/2006 | Luo et al. | 375/240.16 |
| 2006/0023119 A1 * | 2/2006 | Han | 348/452 |
| 2007/0211800 A1 * | 9/2007 | Shi et al. | 375/240.16 |
| 2007/0242750 A1 * | 10/2007 | De Haan et al. | 375/240.16 |
| 2008/0056367 A1 * | 3/2008 | Wenjin | 375/240.16 |
| 2008/0204592 A1 * | 8/2008 | Jia et al. | 348/402.1 |
| 2009/0086814 A1 * | 4/2009 | Leontaris et al. | 375/240.02 |
| 2010/0002772 A1 * | 1/2010 | Vandame | 375/240.16 |
| 2010/0277644 A1 * | 11/2010 | Blume | 348/452 |
| 2010/0290530 A1 * | 11/2010 | Huang et al. | 375/240.16 |
| 2011/0075027 A1 * | 3/2011 | Wu et al. | 348/452 |
| 2011/0090960 A1 * | 4/2011 | Leontaris et al. | 375/240.12 |
| 2011/0200110 A1 * | 8/2011 | Chen et al. | 375/240.16 |
| 2011/0255596 A1 * | 10/2011 | Chen et al. | 375/240.16 |
| 2011/0310295 A1 * | 12/2011 | Chen et al. | 348/441 |

OTHER PUBLICATIONS

De Haan, Gerard; "IC for Motion-Compensated DE-Interlacing, Noise Reduction, and Picture-Rate Conversion"; IEEE Trans. on Consumer Electronics; vol. 45, No. 3; pp. 617-624 (Aug. 1, 1999).

International Search Report for International Patent Application PCT/IB2008/053373 (Jun. 29, 2009), Published as WO2009/034492A3.

* cited by examiner

METHOD, APPARATUS, AND SYSTEM FOR LINE-BASED MOTION COMPENSATION IN VIDEO IMAGE DATA

FIELD OF THE INVENTION

The present invention is related to a method, apparatus, and system for line-based motion estimation and line-based motion compensation in video image data. The present invention is further related to a computer program product comprising program code implementing said method, and to a data carrier comprising said computer program.

TECHNICAL BACKGROUND OF THE INVENTION

The method, apparatus, and system according to the present invention are configured to compute interpolated image data of a video image data by means of line-based motion estimation and compensation and to detect and handle errors in interpolated image data obtained as result of performing the line-based motion compensation. The present invention allows efficient use of chip-internal memory and efficient interacting of components, devices, and/or modules enabling the line-based motion estimation and compensation, and processing of the interpolated image data obtained as result of performing the line-based motion compensation, wherein the quality of the resulting image data to be visualized is improved considerably and in an effective way at the same time.

Hereinafter, the present invention and its underlying problem is described with regard to the processing of a video signal for line-based motion estimation and motion compensation within a video processing apparatus such as a microprocessor or microcontroller having line memory devices, whereas, it should be noted, that the present invention is not restricted to this application, but can also be used for other video processing apparatus.

The market introduction of TV-sets based on 100/120 Hz frame rate or even higher required the development of reliable Field/Frame Rate Up-conversion (FRU) techniques to remove artefacts within a picture such as large area flickers and line flickers. Standard FRU methods, which interpolate the missing image fields to be displayed on Displays without performing an estimation and compensation of the motion of moving objects in successive image fields, are satisfactory in many applications, especially with regard to a better quality of the image and with regard to the reduction of the above-mentioned artefacts. However, many pictures contain moving objects, like persons, subtitles and the like, which cause so-called motion judders.

This problem is better understood by referring to FIG. 1, wherein the motion trajectory of the moving objects (white squares) in the original image fields (i.e. transmitted and received image fields) is supposed to be straight-lined. If the missing fields/frames result from interpolation by means of the above mentioned standard FRU methods (i.e. without motion estimation and compensation), the motion of the moving object in the interpolated fields (dark grey squares) is not at a position as expected by the observer (dotted squares). Such artefacts are visible and induce a blurring effect especially of fast moving objects. These blurring effects typically reduce the quality of the displayed images significantly.

In order to avoid such blurring effects and to reduce artefacts several methods for motion estimation and motion compensation—or shortly MEMC—are proposed. This MEMC provides the detecting of a moving part or object within the received image fields and then the interpolation of the missing fields according to the estimated motion by incorporating the missing object or part in an estimated field.

FIG. 2 shows schematically the change of the position of a moving object between two successive image fields. Between two successive received image fields/frames, the moving objects will have changed their position, e. g. object MO which is in the previous field/frame T in position A is then in the current field/frame T+1 then in position B. This means, that a motion exists from the previous field/frame T to the current field/frame T+1. This motion of an object in successive image fields/frames can be represented by a so-called motion vector. The motion vector AB represents the motion of the object MO from position A in the previous field T to position B in the current field/frame T+1. This motion vector AB typically has a horizontal and a vertical vector component. Starting from point A in the previous field T and applying this motion vector AB to the object MO the object MO is then translated in position B in the current field/frame T+1. The missing position I of the object MO in the missing field/frame T+½ that has to be interpolated must be calculated by the interpolation of the previous field T and the current field T+1 taken account of the respective positions A, B of the moving object MO. If the object MO does not change its position between the previous field/frame and the current field/frame, e. g., if A and B are the same, position I in the missing field is obtained by the translation of A with a motion vector |AB|/2. In this manner the missing field T+½ is interpolated with a moving object in the right position with the consequence that blurring effects are effectively avoided.

Theoretically, for each pixel of a field a corresponding motion vector has to be calculated. However, this would increase the number of calculation needed and thus the memory requirements enormously. To reduce this enormous calculation and memory effort there exist basically two different approaches:

The first approach employs a so-called block-based MEMC. This first approach assumes that the dimension of the object in the image is always larger than that of a single pixel. Therefore, the image field is divided into several image blocks. For MEMC only one motion vector is calculated for each block.

The second approach employs a so-called line-based MEMC. In this second approach the algorithm is based on a reduced set of video input data of a single line of a field or a part of this line. The present invention is based on this second MEMC approach.

In present line-based MEMC systems, image data is usually stored in a local buffer or on chip memory, the so-called line memory, to which rather extreme bandwidth requirements are made. Many present MEMC systems, like the implementations described by Gerard de Haan in EP 765 572 B1 and U.S. Pat. No. 6,034,734, apply a cache memory (e.g. a two-dimensional buffer) to reduce the bandwidth requirements and to store a sub-set of an image. The motion compensation device or module fetches video image data from this cache while applying motion vectors. Typically, in MEMC systems this cache covers the whole search range of the motion vectors. Usually, the cache consists of a great amount of so-called line memories. This results in a relatively large amount of memory, e.g. 720 pixels wide and 24 lines (with an associated maximum vertical vector range of [−12−+12]. Such a cache comprising a great amount of single line memories requires a huge memory needed only for MEMC data buffering. As a consequence, the memory portion within the processor covers a relatively sizable chip area.

Commonly used MEMC algorithms compensate the motion in two directions, i.e. the motion in the horizontal direction and as well in the vertical direction. For that operation a memory access should be randomly possible, which requires for an application in hardware sufficient embedded chip memory within the video processor for the different temporal incoming data streams. The size of this embedded chip memory strongly depends on the search range (i.e. search area) for the motion of an object, as already outlined above, where the motion estimation can match similar video patterns in two temporal positions and derive the velocity of the motion in terms of pixels per frame or per field.

However, this matching process does not always work perfectly, since methods to determine the quality of the measured motion vector are required. Therefore, for the internal storage of further temporal incoming video signals additional memory resources are required. This, however, increases the amount of embedded memory even further, which leads to an increase of the chip area since for an integrated circuit it is the chip internal memory which significantly determines the chip area. Consequently, the chip is getting more and more expensive. Especially in the mainstream market segment such as for modern Plasma- and LCD-TVs these additional costs typically form a limiting factor for an MEMC implementation.

The present invention is, therefore, based on the object to provide a more efficient use of the chip-internal resources and especially of the chip-internal memory with regard to motion estimation and motion compensation, wherein the quality of the resulting image data is to be improved at the same time.

SUMMARY OF THE INVENTION

This object is achieved by a method for line-based motion estimation and line-based motion compensation in video image data comprising features according to claim 1, an apparatus for line-based motion estimation and line-based motion compensation in video image data comprising features according to claim 15, a TV-set comprising features according to claim 30, a computer program product comprising features according to claim 31, a data carrier comprising features according to claim 33, and/or a system for line-based motion estimation and line-based motion compensation in video image data comprising features according to claim 34.

Further embodiments of the present invention are provided with the corresponding dependent claims.

The object of the present invention is achieved by a method for line-based motion estimation and line-based motion compensation in video image data, especially for motion estimated and compensated field/frame rate up-conversion in consecutive fields/frames of a motion picture, comprising the steps of:
  providing a set of motion vectors for the line-based motion compensation in an image data of a current field/frame by performing the line-based motion estimation;
  performing the line-based motion compensation by interpolating the image data of the current field/frame by use of the provided set of motion vectors;
  providing an interpolated image data of the image data of the current field/frame as result of the performing of the line-based motion compensation; and
  blurring of a region of the interpolated image data of the current field/frame if at least one pixel of the region was interpolated according to a motion vector from the set of motion vectors, which is indicated as not reliable for the line-based motion compensation.

One basic idea of the present invention is based on the conclusion that for the main stream market segment the performance and therefore the search range can be limited to the occurrence of the most likely horizontal motion in natural captured scenes. Thus, the present invention describes motion estimation and motion compensation which operate in the horizontal direction only—line-based motion estimation and compensation. This offers the possibility of reducing of the chip embedded memory as just line wise storage of video image data is required according to the present invention. The steps provided above are performed just in horizontal direction according to the present invention, as line-based image processing is performed. Thus, also run time of components, modules, or devices configured to perform the steps above can be improved considerably, as the image data is processed in horizontal direction only (processing of the image data in vertical direction is not mandatory), wherein quality of results of the motion estimation and compensation is ensured and even improved at the same time.

Furthermore, the present invention provides an effective and efficient way of handling of artefacts in interpolated video data, wherein this handling of artefacts is performed in horizontal direction too, in particular, by adaptive blurring of artefact regions of the interpolated image data.

According to an embodiment of the present invention, the blurring comprises a suppressing of the at least one pixel.

If two pixels of the region were interpolated according to motion vectors from the set of motion vectors, which are indicated as not reliable for the line-based motion compensation, and if the motion vectors arc intersected by a further motion vector from the set of motion vectors, which is indicated as reliable for the line-based motion compensation, according to an embodiment of the present invention, the blurring comprises a combining of pixels between the two pixels and of the two pixels to one uniform region.

Further, if the region consists of more than two neighbouring pixels of the region were interpolated according to motion vectors from the set of motion vectors, which are indicated as not reliable for the line-based motion compensation, according to an embodiment of the present invention, the blurring comprises an extending of the region by inserting first two pixels in front of the region and by inserting second two pixels after the region, wherein the first two pixels and the second two pixels correspond to pixels of motion vectors indicated as not reliable for the line-based motion compensation.

According to an embodiment of the present invention, a median filter is used for the line-based motion compensation.

According to an further embodiment of the present invention, the median filter uses as input motion vectors provided for the line-based motion compensation at neighbouring pixels already compensated, motion vectors provided for the line-based motion compensation at neighbouring pixels to be compensated, and a current motion vector provided for a current pixel of the image data of the current field/frame being compensated currently.

According to an embodiment of the present invention, the line-based motion compensation is performed with regard to at least one of following: luminance values and chrominance values.

According to an embodiment of the present invention, the line-based motion estimation is performed in horizontal direction by use of a line memory comprising the image data of the current field/frame. This line memory may be configured such, that it has a size of one video line or at least of the incoming or actually processing video image data.

According to an embodiment of the present invention, each motion vector of the set of motion vectors is provided for the line-based motion compensation at a corresponding pixel taken from the image data of the current field/frame.

According to a further embodiment of the present invention, the corresponding pixel is taken from the line memory comprising the image data of the current field/frame.

According to an embodiment of the present invention, wherein the line-based motion estimation is performed in horizontal direction by use of a line memory comprising image data of a previous field/frame. This line memory may be configured such, that it has a size of one video line or at least of the incoming or actually processing video image data.

According to an embodiment of the present invention, the line-based motion compensation is performed in horizontal direction by use of the line memory comprising the image data of the current field/frame.

According to an embodiment of the present invention, the providing of the set of motion vectors by performing the line-based motion estimation comprises:

selecting of a motion vector to be used for the line-based motion compensation;

detecting of a quality value for the selected motion vector, wherein the quality value indicates whether or not the selected motion vector is reliable for the line-based motion compensation; and adding of the selected motion vector to the set of motion vectors.

A quality value indicate, how well the actual direction of a movement and the actual speed or tempo of an object in image data has been characterized by the selected motion vector. If one of the parameters (actual direction of a movement and actual speed or tempo of an object) does not fit, artefacts may occur in the interpolated image data, when compensating the image data by use of the selected vector. Thus, such a vector is not reliable for the line-based motion compensation and represents a bad vector. Here, different reasons for selection of a vector, which is not reliable for the line-based motion compensation, are possible: e.g., revealing or occlusion of objects, abrupt changes of strength and/or direction of an object, exceed of search range when selecting motion vectors.

According to an embodiment of the present invention, the providing of the set of motion vectors by performing the line-based motion estimation comprises:

searching for a further motion vector from a line above a current line used in the line-based motion estimation, if the detected quality value indicates that the selected motion vector is not reliable for the line-based motion compensation;

detecting of a further quality value for the further motion vector, wherein the further quality value indicates whether or not the further motion vector is reliable for the line-based motion compensation; and replacing the selected motion vector by the further motion vector if the further quality value indicates the further motion vector as being reliable for the motion compensation.

According to this embodiment, it is ensured that reliable motion vectors are used for motion compensation. If a selected motion vector is identified as being bad i.e. not reliable, a next environment is taken in account and a further search for a reliable motion vector is performed with regard to this next environment in the image data. If a reliable vector could be found, the replacing is performed. Otherwise, if no reliable motion vector could be found or selected, the blurring as sketched above and as explained bellow in more detail is performed.

The object mentioned above is achieved by an apparatus for line-based motion estimation and line-based motion compensation in video image data, especially for motion estimated and compensated field/frame rate up-conversion in consecutive fields/frames of a motion picture, wherein the apparatus comprises:

a module, device, or component configured to provide a set of motion vectors for the line-based motion compensation in an image data of a current field/frame by performing the line-based motion estimation;

a module, device, or component configured to perform the line-based motion compensation by interpolating the image data of the current field/frame according to the provided set of motion vectors;

a module, device, or component configured to obtain an interpolated image data of the image data of the current field/frame after the performing of the line-based motion compensation; and a module, device, or component configured to blur a region of the interpolated image data of the current field/frame if at least one pixel of the region was interpolated according to a motion vector from the set of motion vectors, which is indicated as not reliable for the line-based motion compensation.

As already mentioned above, the present invention describes motion estimation and motion compensation which operate in the horizontal direction only—line-based motion estimation and compensation. Thus, the modules, devices, or components of the apparatus provided above are configured to process video image data in horizontal direction, as line-based image processing is performed. In this way, the resources required by the apparatus for storing image data can be reduced considerably, as just line wise storage of video image data is required according to the present invention. Further, also run time of the modules, devices, or components of the apparatus and, thus, also the run time of the apparatus itself can be improved considerably by the present invention, as the image data is processed in horizontal direction only (processing of the image data in vertical direction is not mandatory). Further, despite the processing of image data in one direction only, the quality of results of the motion estimation and compensation is ensured and even improved at the same time.

According to an embodiment of the present invention, the module, device, or component configured to blur a region of the interpolated image data of the current field/frame is configured to suppress the at least one pixel.

If two pixels of the region were interpolated according to motion vectors from the set of motion vectors, which are indicated as not reliable for the line-based motion compensation, and if the motion vectors are intersected by a further motion vector from the set of motion vectors, which is indicated as reliable for the line-based motion compensation, according to an embodiment of the present invention, the module, device, or component configured to blur a region of the interpolated image data of the current field/frame is configured to combine pixels between the two pixels and of the two pixels to one uniform region.

Further, if the region consists of more than two neighbouring pixels of the region were interpolated according to motion vectors from the set of motion vectors, which are indicated as not reliable for the line-based motion compensation, according to an embodiment of the present invention, the module, device, or component configured to blur a region of the interpolated image data of the current field/frame is configured to extend the region by inserting first two pixels in front of the region and by inserting second two pixels after the region, wherein the first two pixels and the second two pixels correspond to pixels of motion vectors indicated as not reliable for the line-based motion compensation.

According to a further embodiment of the present invention, the module, device, or component configured to perform the line-based motion compensation is configured to use a median filter for the line-based motion compensation.

According to an embodiment of the present invention, the median filter is configured to use as input motion vectors provided for the line-based motion compensation at neighbouring pixels already compensated, motion vectors provided for the line-based motion compensation at neighbouring pixels to be compensated, and a current motion vector provided for a current pixel of the image data of the current field/frame being compensated currently.

According to an embodiment of the present invention, the module, device, or component configured to perform the line-based motion compensation is configured to perform the line-based motion compensation with regard to at least one of following: luminance values and chrominance values.

According to an embodiment of the present invention, the apparatus comprises a first line memory configured to store the image data of the current field/frame and wherein the line-based motion estimation is performed in horizontal direction by use of the first line memory. This first line memory may be configured such, that it has a size of one video line or at least of the incoming or actually processing video image data.

According to an embodiment of the present invention, the module, device, or component configured to provide a set of motion vectors is configured to provide each motion vector of the set of motion vectors at a corresponding pixel taken from the image data of the current field/frame.

According to an embodiment of the present invention, the corresponding pixel is taken from the first line memory.

According to an embodiment of the present invention, the line-based motion compensation is performed in horizontal direction by use of the first line memory.

According to a further embodiment of the present invention, the apparatus comprises a second line memory configured to store image data of a previous field/frame. This second line memory may be configured such, that it has a size of one video line or at least of the incoming or actually processing video image data.

According to an embodiment of the present invention, the apparatus comprises a third line memory comprising motion vectors of a line above, wherein the motion vectors of a line above have been provided by a previous performance of the line-based motion estimation for a line above. Also the third line memory may be configured such, that it has a size of one video line or at least of the incoming or actually processing video image data.

According to an embodiment of the present invention, the module, device, or component configured to provide a set of motion vectors is configured to:

select a motion vector to be used for the line-based motion compensation;

detect a quality value for the selected motion vector, wherein the quality value indicates whether or not the selected motion vector is reliable for the line-based motion compensation; and add the selected motion vector to the set of motion vectors.

According to an embodiment of the present invention, the module, device, or component configured to provide a set of motion vectors is configured to:

search for a further motion vector from a line above a current line used in the line-based motion estimation, if the detected quality value indicates that the selected motion vector is not reliable for the line-based motion compensation;

detect a further quality value for the further motion vector, wherein the further quality value indicates whether or not the further motion vector is reliable for the line-based motion compensation; and replace the selected motion vector by the further motion vector if the further quality value indicates the further motion vector as being reliable for the motion compensation.

Here, it has to be noted, that according to the present invention the apparatus is configured to perform the steps of the method sketched above and explained in more detail bellow. Thus, the apparatus provides modules, devices, or components being configured to perform the corresponding steps of the method, wherein according to the present invention no strict partition of the required modules, devices, or components is necessary. According to the present invention, a variable design of the apparatus with regard to its modules, devices, or components is possible. Thus, for example, when performing motion estimation and motion compensation, two separate modules, devices, or components can be provided—one module, device, or component configured to perform the motion estimation and one module, device, or component configured to perform the motion compensation. However, also one module configured to perform both the motion compensation and the motion estimation can be provided according to the present invention.

The object of the present invention is achieved also by a TV-set comprising the apparatus sketched above and explained in more detail bellow.

Further, the object provided above is achieved also by a computer program product comprising a code, said code being configured to implement the method sketched above and explained in more detail bellow.

According to an embodiment of the present invention, the computer program can be embodied on a data carrier.

Additionally, the object of the present invention provided above is achieved by a data carrier comprising the computer program product.

Furthermore, the object of the present invention provided above is achieved by a system for line-based motion estimation and line-based motion compensation in video image data, especially for motion estimated and compensated field/frame rate up-conversion in consecutive fields/frames of a motion picture, wherein the system comprises:

a module, device, or component configured to provide a set of motion vectors for the line-based motion compensation in an image data of a current field/frame by performing the line-based motion estimation;

a module, device, or component configured to perform the line-based motion compensation by interpolating the image data of the current field/frame according to the provided set of motion vectors and to provide an interpolated image data of the image data of the current field/frame as result of the performing of the line-based motion compensation; and a module, device, or component configured to blur a region of the interpolated image data of the current field/frame if at least one pixel of the region was interpolated according to a motion vector from the set of motion vectors, which is indicated as not reliable for the line-based motion compensation.

It has to be noted that for the system the same principles as the principles of the apparatus (sketched above and explained in more detail bellow) are applicable. In general, the system is configured to perform the method for line-based motion estimation and line-based motion compensation in video image data and, thus, comprises appropriate modules, devices, or components configured to perform the steps of said method.

According to an embodiment of the present invention, the system comprises a first line memory configured to store the image data of the current field/frame and wherein the line-based motion estimation is performed in horizontal direction by use of the first line memory. This first line memory may be configured such, that it has a size of one video line or at least of the incoming or actually processing video image data.

According to a further embodiment, the line-based motion compensation is performed in horizontal direction by use of the first line memory.

According to an embodiment of the present invention, the system comprises a second line memory configured to store image data of a previous field/frame. This second line memory may be configured such, that it has a size of one video line or at least of the incoming or actually processing video image data.

According to a further embodiment of the present invention, the system comprises a third line memory comprising motion vectors of a line above, wherein the motion vectors of a line above have been provided by a previous performance of the line-based motion estimation for a line above. According to an embodiment of the present invention, the third line memory may be configured such, that it has a size of one video line or at least of the incoming or actually processing video image data.

As already mentioned above, the present invention is based on the conclusion that for the main stream market segment the performance and therefore the search range can be limited to the occurrence of the most likely horizontal motion in natural captured scenes. This offers the possibility to reduce the chip embedded memory as just line wise storage of video image data is required according to the present invention. Thus, the chip embedded memory can be reduced, for example, to a couple of line memories only. Here, the use of one single line memory for a previous and of one single line memory for the current motion portrayal as search range is sufficient to perform the present invention. In this way, a considerable reduction of the chip embedded memory is achieved by use of the present invention. Furthermore, the methodology presented enables a fast performance of motion estimation and motion compensation, wherein the quality of the resulting video images is improved at the same time (despite the processing in one direction only).

The present invention further describes a methodology of motion estimation and motion compensation which operates only in the horizontal direction and therefore enables realization of the motion estimation and motion compensation operations which use a single line buffer memory, the so-called line memory.

In video signal processing line memories are often used in other applications which already have access to the previous and current motion portrayal e.g. like so-called de-interlacer applications or temporal noise reduction applications. According to the present invention the used line memories used in these applications are now additionally used also for motion estimation and motion compensation operations. By using these existing line memories no further memory bandwidth has to be added to the memory bus. Thus, this solution offers the possibility to accomplish the motion estimation and motion compensation operations by adding a minimal or in the optimal case no additional memory to the existing video processing system.

The methodology according to the present invention for motion estimation and motion compensation can operate on line memories of the previous and current field or frame. This advantageously enables silicon area reducing and cost saving implementations.

The compensation performance is limited to motion in one direction and especially to the horizontal direction only, since most of the motion in natural scenes has this tendency. By using existing line memories of the video signal processing system, the memory bandwidth is kept uninfluenced.

A further advantage is that several error reduction methods reduce the visibility of artefacts. According to the present invention, an effective identification and handling of artefacts arising in the interpolated image data obtained after performing the line-based motion estimation and compensation is enabled. In particular, the blurring of (line) regions performed according enables a considerable improving of the interpolated image data and can be performed in a fast and effective way at the same time.

In following, for sake of conciseness terms motion compensation and motion estimation will be used in most cases when explaining the present invention and its embodiments in more detail. It has to be noted, that line-based motion estimation and line-base motion compensation are meant in these cases.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are schematically specified in the figures of the drawings, in which.

In all figures of the drawings elements, features and signals which are the same or at least have the same functionality have been provided with the same reference symbols, descriptions and abbreviations unless explicitly stated otherwise.

DETAILED DESCRIPTION OF EMBODIMENTS OF THE PRESENT INVENTION

In the following description of the present invention first of all a short overview of the motion estimation and motion compensation is presented.

The MEMC method consists mainly of two sections, the motion estimation and the motion compensation method. The motion estimation performs the measurement of the motion and derives the velocity of the displayed regions in pixel per picture (i.e. field or frame). Also the direction of the motion will be indicated by a positive or negative sign. These measured motion information is described in the form of a motion vector. The motion vector is used for the motion compensation to interpolate the picture at the temporal accurate position and to avoid so-called judder effects and/or so-called motion blurring effects.

Figure 1:
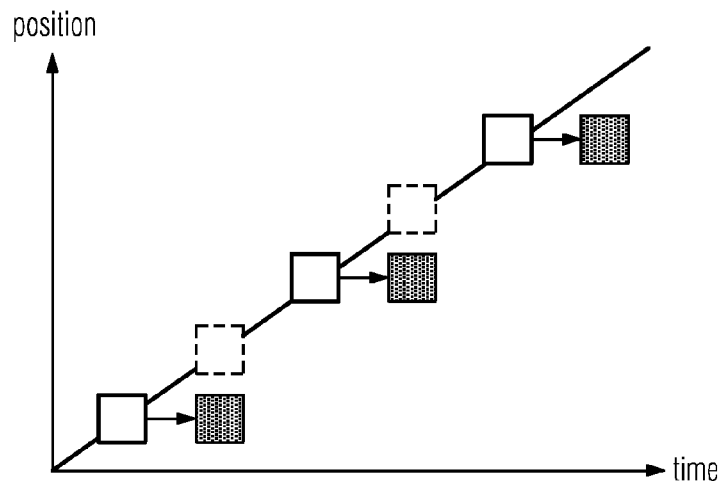
FIG. 1 shows the result of a standard (i.e. non motion compensated) FRU method.
Figure 2:
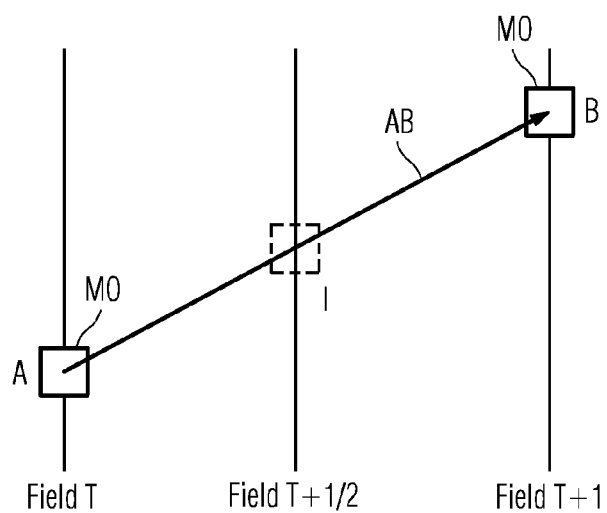
FIG. 2 shows the change of position of a moving object between two consecutive received image fields.
Figure 3A:
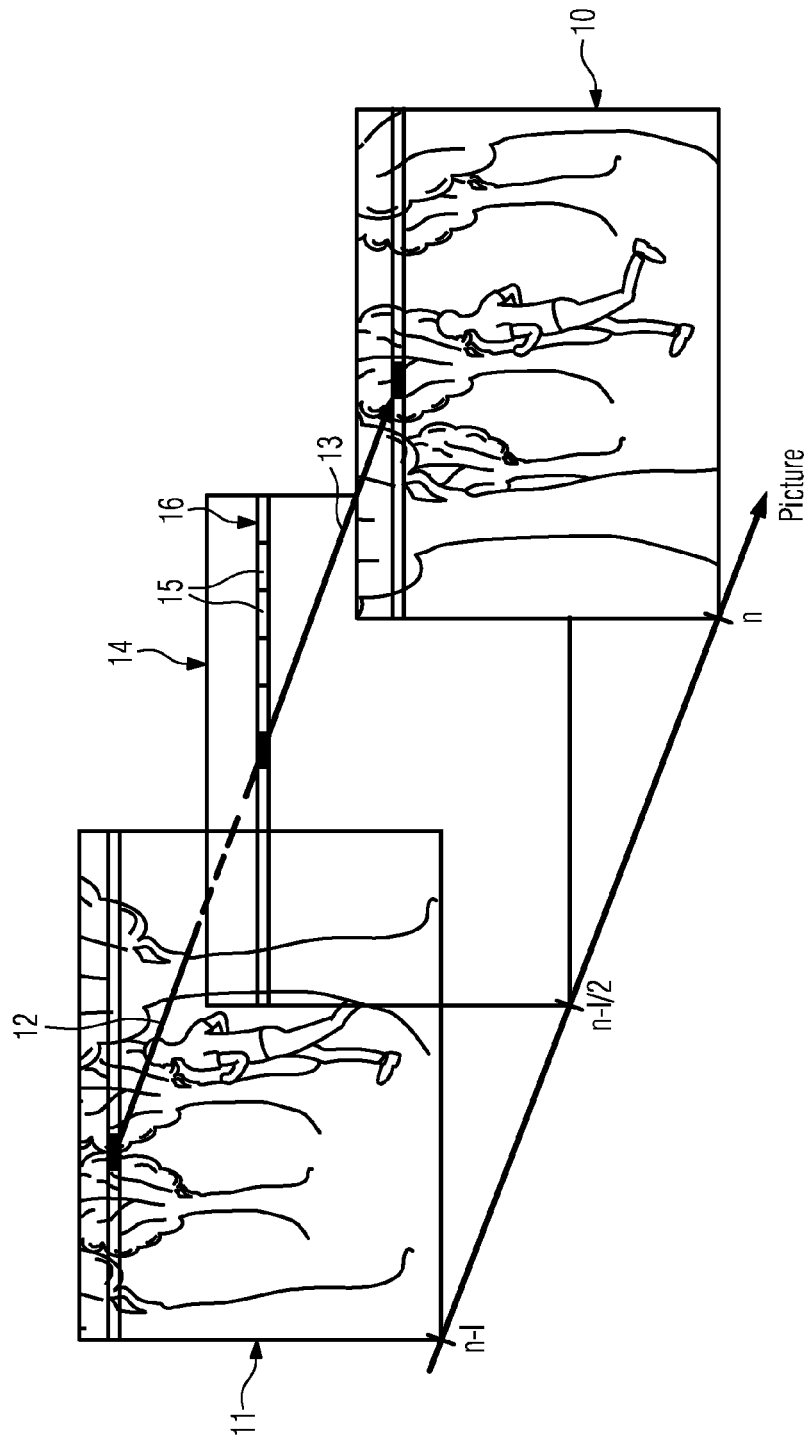
FIGS. 3A, 3B show the motion estimation principle for the line-based motion estimation by means of a current frame and the corresponding previous frame.
Figure 3B:
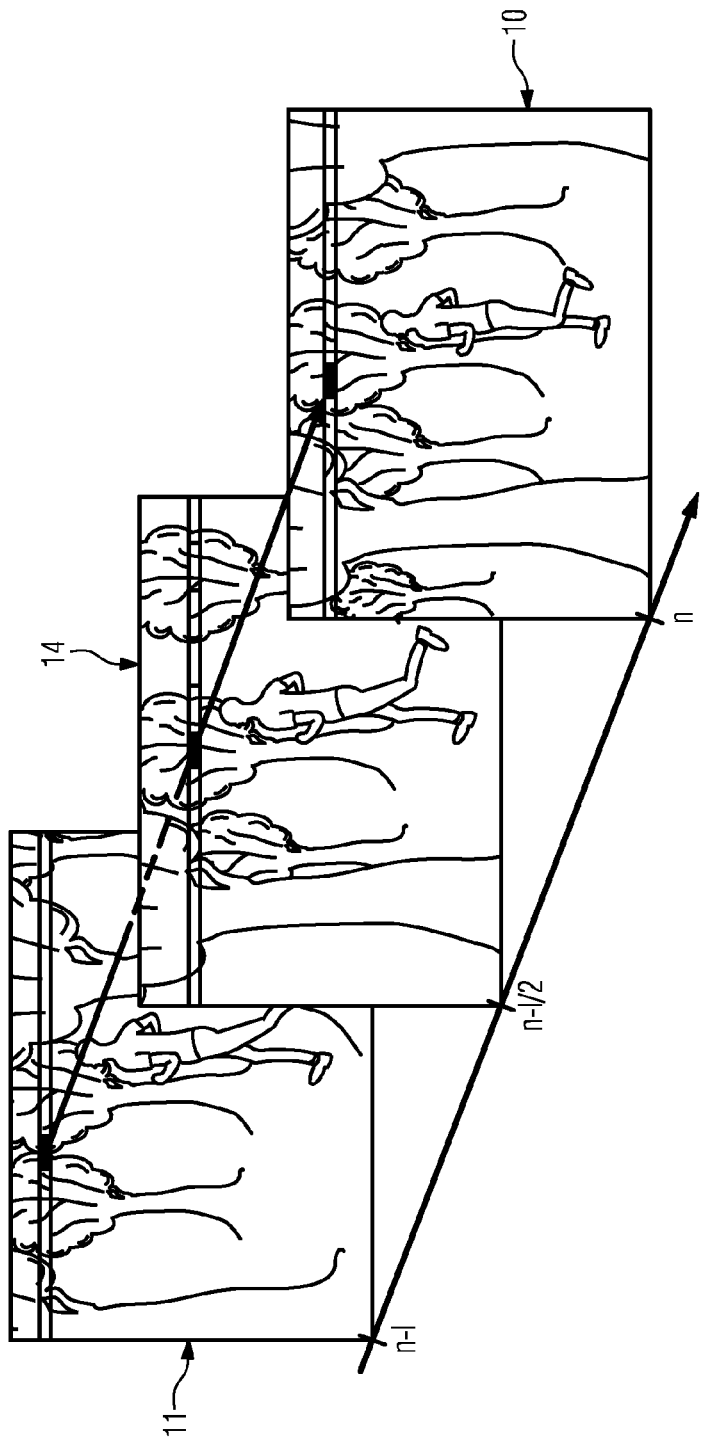

FIGS. 3A and 3B show the motion estimation principle for line-based motion estimation by means of a current picture (field or frame) $10(n)$ and a corresponding previous picture $11(n\text{-}1)$. According to the temporal positions the motion vector 12, 13 will be split by its length into two parts, where the first vector part 12 points into the previous picture 11 and the second vector part 13 points into the current picture 10. For the interpolation of a missing picture $14(n\text{-}1/2)$ between the current and the previous pictures 10, 11 pixels 15 from both temporal pictures 10, 11 are taken into account for the compensation. In line-based MEMC only the pixels 15 within the same line 16 are used at the same time and the MEMC is performed for a single line 16 of a field or frame only. For this kind of MEMC the pixels 15 of the current picture 10 are compared with the corresponding pixels 15 of the previous picture 11 to estimate and compensate the corresponding pixels 15 of the missing picture 14.

Figure 4:
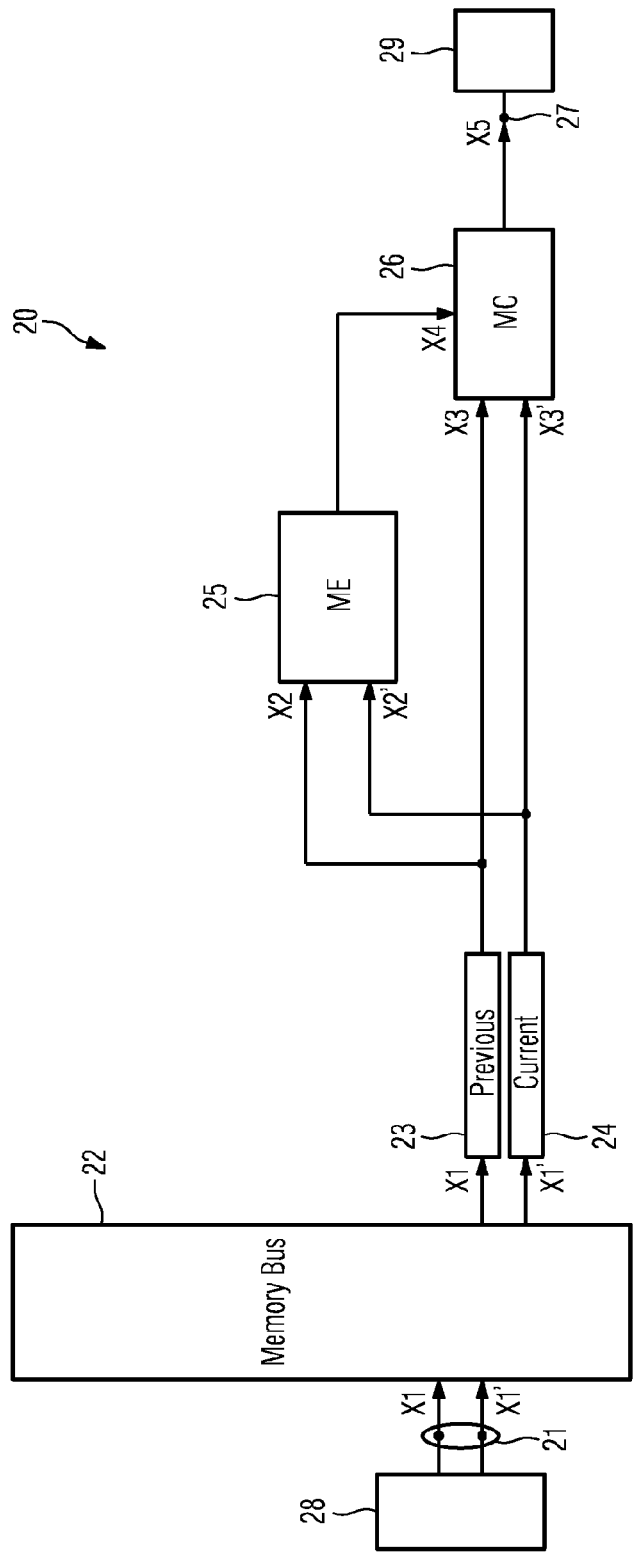
FIG. 4 shows a block diagram of a first embodiment of a line-based MEMC system according to the present invention.

FIG. 4 shows a block diagram of a line-based MEMC system according to the present invention. The MEMC system is denoted by reference number 20. The MEMC system 20 comprises an input terminal 21, a bus 22, two line memories 23, 24, a motion estimation device or module 25, a motion compensation device or module 26 and an output terminal 27. It is assumed that the bus 22 is an external bus 22 and especially an external memory bus 22. However, it may also be possible, that the bus 22 is an internal bus 22. At the input side, the bus 22 is connected to an external memory device or module 28 such as a SDRAM, a DDR-RAM, etc. Image data to be displayed in a panel 29 such as a plasma- or LCD-panel or a CRT-screen is stored in this external memory 28. Via the input terminal 21 and the memory bus 22 this image data X1, X1' is transferred to both line memories 23, 24. According to one embodiment of the present invention only two line memories 23, 24 are needed whereas the first line memory 23 is used for buffering image data X1 of the previous picture and the other line memory 24 is used for storing the image data X1' of the current picture. However, it should be clear that also a greater number of line memories may be provided.

A line memory 23, 24 as used in the present patent application indicates an embedded memory of a size of one video line of a frame or a field or at least less of the incoming video signal stream or actually processing video signal stream. A field denotes a video image or picture which comprises either odd or even lines. A frame denotes a video image comprising of the complete video information for one picture, i.e. of a field for the odd lines and the corresponding field for the even lines. A line denotes a full horizontal row within a field of one video picture or at least a part of this row.

Both of the line memories 23, 24 are coupled—on their output sides—to the motion estimation device or module 25 and to the motion compensation device or module 26. This enables the image data X1, X1' stored in the line memories 23, 24 to be transferred to the motion estimation device or module 25 and to the motion compensation device or module 26, respectively. In FIG. 4 the corresponding data signals to the motion estimation device or module 25 are denoted by X2, X2' and the corresponding data signals motion compensation device or module 26 are denoted by X3, X3'.

The motion estimation device or module 25 generates a motion vector signal X4 out of the image data X2, X2' stored in the line memories 23, 24 by employing a matching process. This vector signal X4 is transferred to the motion compensation device or module 26. The motion compensation device or module 26 performs a motion compensation using the image data X3, X3' stored in the line memories 23, 24 and applying the vector data X4 to this image data X3, X3'. At the output terminal 27, the motion compensation device or module 27 provides a video signal X5 which comprises information for a motion compensated picture. This video signal X5 is transferred via the output terminal 27 to a display 29, such as a LCD-panel 29 or the like.

With regard to FIG. 5, hereinafter the operation of the motion estimation device or module 25 is described in more detail:

For the motion estimation a matching process is employed to select a corresponding series of pixels 32 which fits best to a given amount of pixels 30. For this selection a given amount of pixels 30 of a line of a current frame around the centre pixel 31 for which the motion shall be determined is taken from a line memory 24 of the current frame 32. Hereinafter this given amount of pixels 30 is denoted to as series of pixels 30. In the present embodiment a series of pixels 30 comprises 9 single pixels 33. It is self-understood that a series can also comprise a greater or a smaller amount of pixels 33.

For the selection the luminance profile of the pixels 33 is used as the matching parameter. Luminance is a photometric measure of the density of luminous intensity in a given direction. It describes the amount of light that passes through or is emitted from a particular area, and falls within a given solid angle. Thus, luminance is the photometric measure of the brightness in a frame of a motion picture. If the luminance is high, the picture is bright and if it is low the picture is dark. Thus, luminance is the black and white part of the picture.

This luminance profile is used to find out that series of nine pixels 34 out of the previous frame 35 which fits best with the series of nine pixels 30 of the current frame 32. In the embodiment of FIG. 5 the luminance profile of the series of nine pixels 30 of the current frame 32 are compared with the luminance profiles of several corresponding series of nine pixels 34 of the previous frame 35. In order to derive the true motion the series of nine pixels 30 will be shifted over the search range in the horizontal direction 36. It is assumed that that series of nine pixels 34 of the previous frame 35 which shows the best luminance profile matching (with the series of nine pixels 30 of the current frame 32) is the correct series of pixels. These series of pixels 30, 34 are then used for the computation of the motion vector.

A typical value for the search range comprises, e.g., 64 pixels (+31 . . . −32). However, it may also be possible to use less than 64 pixels; however, the quality of the result of this comparison is increasingly going down then. On the other hand it is also possible to use more than 64 pixels. Then the quality of the selection result is going up, however, this needs more computational effort. Therefore, typically a trade-off which provides an optimization between best quality of the selection result and simultaneously a minimum computation effort is employed.

In a preferred embodiment for each selected motion vector 37 a single matching process is performed in the way described above. This matching process is performed by assigning a quality degree and/or a failure degree for each series of pixels 30. Then, a quality-degree and/or a failure degree are assigned to each one of those series of pixels 30 which are undergoing the matching process. Those series of pixels 30 having the highest quality-degrees and/or the lowest failure degrees are selected as most probable series of pixels. These series of pixels 30 are then used for computing the motion vectors for the horizontal motion. Typically, but not necessarily a SAD method (SAD=sum of absolute difference) and/or ADRC (Adaptive Dynamic Range Coding) method is used for the comparison of the luminance and/or chrominance values.

According to this embodiment of the present invention, pre-selected motion vector samples can be used for the motion estimation.

Figure 5:
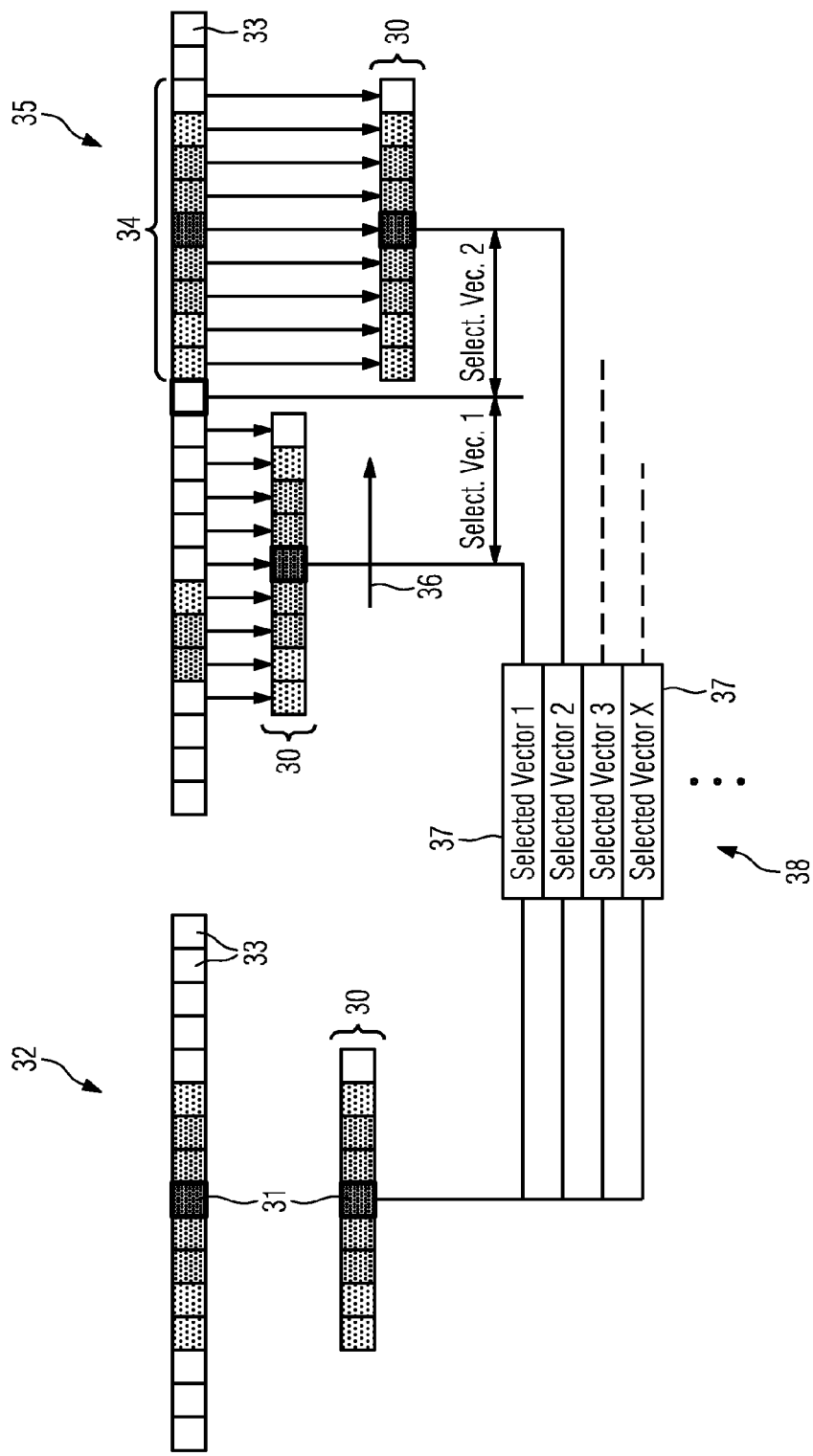
FIG. 5 shows an example to illustrate the matching process of the motion estimation according to an embodiment of the present invention.

Assuming the motion of an object in the scene will be constant from field/frame to field/frame and the object is larger than a series of pixels (e.g. the above mentioned 9 pixels), then the matching process can then be performed more efficiently if a set 38 of pre-selected motion vectors 37—the so-called motion vector samples 37—are checked for a matching of the luminance profile (see FIG. 5). For example, one selected motion vector 37 can be taken from the neighbouring pixel. A second selected motion vector can be taken from the previous line, if the already estimated motion vectors are stored in a vector memory specially designed for the different motion vector samples.

The zero-vector which indicates no motion of the object is typically one of the most used motion vector samples. This zero-vector is used in order to more efficiently detect regions within a picture showing no motion. In principle the amount of pre-selected motion vectors 37 which will be taken into account depend strongly on what kind of motion vector quality is desired.

In order to set up the process of motion estimation and to follow the deviation from the constant motion, a variation of certain pre-selected motion vectors can be required for test operation purposes. According to this embodiment of the present invention, variation of selected motion vectors is taken into account when performing the motion estimation. That means that for pre-selected motion vector samples a certain amount of motion will be added or subtracted. This can be done by applying a variance with different amount of motion speed to these motion vectors. The tested implementation checks between odd pixels and even pixels alternating an update of +/−1 pixel and +/−4 pixels on the previously determined motion vector. The selection of the variance is adjustable and variable as required or as the need arises and depends e.g. on the resolution of the incoming video signal.

For the line-based motion estimation it is very advantageous that the motion vector will converge quickly for the real motion in the scene. Therefore, the selection of the tested motion vectors is treated differently for the first line of a frame or field. For the first line of a frame or field testing is not possible in the normal way since a line above the first line, which is needed for testing, does not exist. In the first line of each field the selected motion vectors which normally test the motion vectors of the line above are loaded with vector values, which e.g. vary according to a triangle function from pixel to pixel. The triangle function oscillates between an adjustable minimum value and an adjustable maximum value. For that purpose also other regular oscillating functions e.g. a saw tooth function, a sinusoidal function, and the like may be employed for the determination of the motion vector of the first line.

In a preferred embodiment a matching process assigns a failure value to each tested motion vector. In another embodiment this value may be also a quality value. It might also be possible to evaluate as well a failure value and a quality value for the matching process. Preferably, the sum of the absolute difference (SAD) is used as the failure value or to at least derive the failure value. Ideally, to find the optimal motion vector a failure value of zero is needed. However, typically the failure value is different from zero. Therefore, the motion vector corresponding with the lowest failure value is then selected as the most probably motion vector representing the motion of an object in the local scene.

In a preferred embodiment a damping value is used which depends on the vector attenuation of the different motion vectors. Here, attenuation of vector selection is performed by vector damping. This enables to control the motion vectors with equal failure values and/or to furnish the motion vector selection process with a certain direction.

Further, the different motion vectors can be advantageously stored in a vector memory. These motion vectors can be then—if required—fetched from the vector memory for further processing and/or for the motion estimation of the next pixels.

The motion estimation process forms a recursive process. Therefore, the size of this vector memory mainly depends on the desired quality level of the matching process. In one embodiment, the tested implementation comprises only one line of a vector memory. In this vector memory every second motion vector will be stored alternately, in order that an access of the motion vectors from the measured line above is possible.

In a preferred embodiment a motion vector histogram is calculated in order to create a highly reliable and homogeneous field of motion vectors. This vector histogram allows a vector majority ranking to derive most and less used motion vectors in an actual scene. In this way, by providing a vector histogram, a robustness improvement can be achieved.

Figure 6:
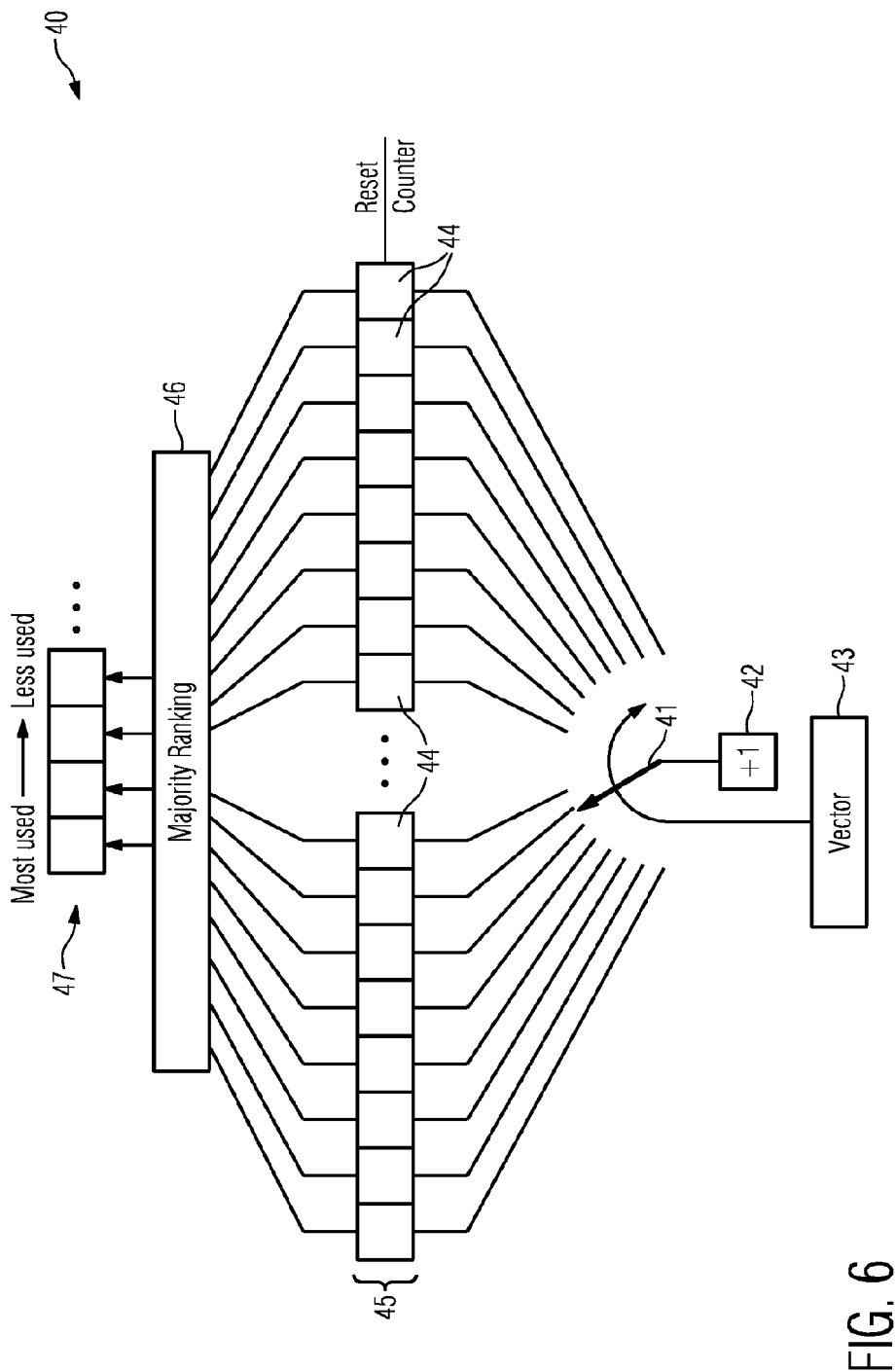
FIG. 6 shows the basic principle for the provision of a motion vector histogram according to an embodiment of the present invention.

FIG. 6 shows an example to illustrate the basic principle for the provision of a motion vector histogram. FIG. 6 shows a vector histogram generator 40 to provide a motion vector histogram. In the embodiment in FIG. 6 the vector histogram generator 40 comprises a switching device or module 41, which is controlled by a +1-incrementing device or module 42. The switching device or module 41 is controlled on the one hand by a motion vector 43 information and on the other hand by the incrementing device or module 42 which shift the switching device or module 41 to the next input terminal of a counting device or module 45 when the next identical motion vector 43 occurs. The counting device or module 45 which comprises different counter cells 44 counts the occurrence of each motion vector and increments the counter by +1 for each occurrence of the motion vector. A ranking device or module 46—which e.g. comprises a simple comparing means—is coupled to the output terminals of the different counter cells 44 of the counting device or module 45. This ranking device or module 46 selects the most often used motion vector and applies this motion vector for the estimation determination. The most often used motion vector may be then stored in a motion vector histogram memory 47.

The provision of a motion vector histogram can be done either for the whole frame or field or only for parts of the frame or field. It is very efficient to split the picture into horizontal stripes and return a most often used vector for each stripe. In very a preferred embodiment news ticker information within a picture can be detected in that way very reliable.

Under certain circumstances the motion estimation will not deliver reliable motion vectors. Especially for vertical movements as well as for occlusions and uncovered areas the matching process sometimes does not provide a reliable access of the current and previous line. Not reliable motion vectors, however, lead to relatively large, undesired differences for the compensation process. According to an embodiment of the present invention, a detection of unreliable vectors is performed.

Figure 7:
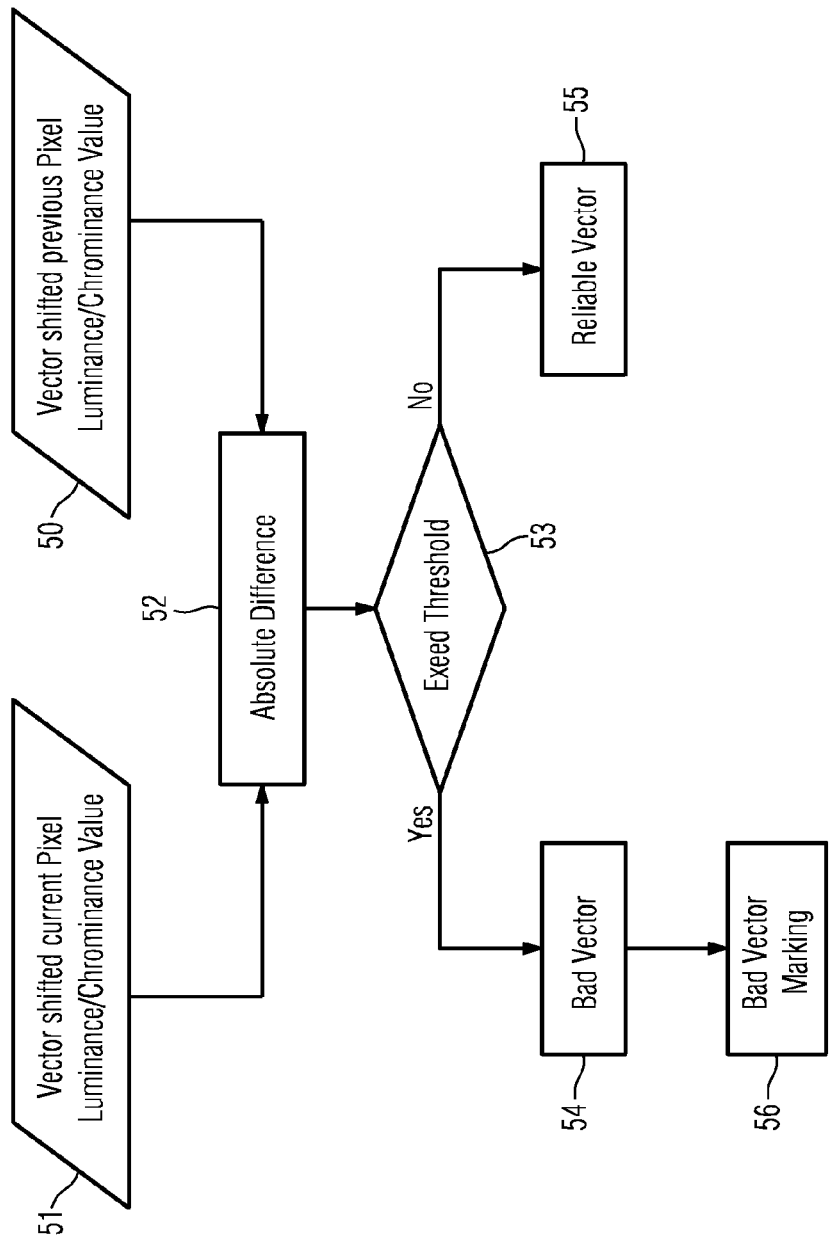
FIG. 7 shows a flow diagram illustrating a process for detection of unreliable vectors according to an embodiment of the present invention.

FIG. 7 shows an example of a flow diagram to illustrate the process for the detection of unreliable vectors according to the embodiment of the present invention. In this detection process, the luminance pixel value 50 of the vector compensated in previous frame or field is compared 52 with the luminance pixel value 51 of the vector compensated current frame or field. If this difference 52 strongly exceeds an adjustable threshold value 53 the current motion vector will be selected as a bad vector 54. Otherwise, it is assumed that this vector is a reliable vector 55. This bad vector 54 will be marked 56 and the MSB-bit of the vector memory will be set e. g. to one. The MSB-bit then indicates whether this vector can be used for further estimation processing or not. Thus, the MSB-bit indicates whether this vector is reliable or not reliable for the motion compensation.

Figure 8:
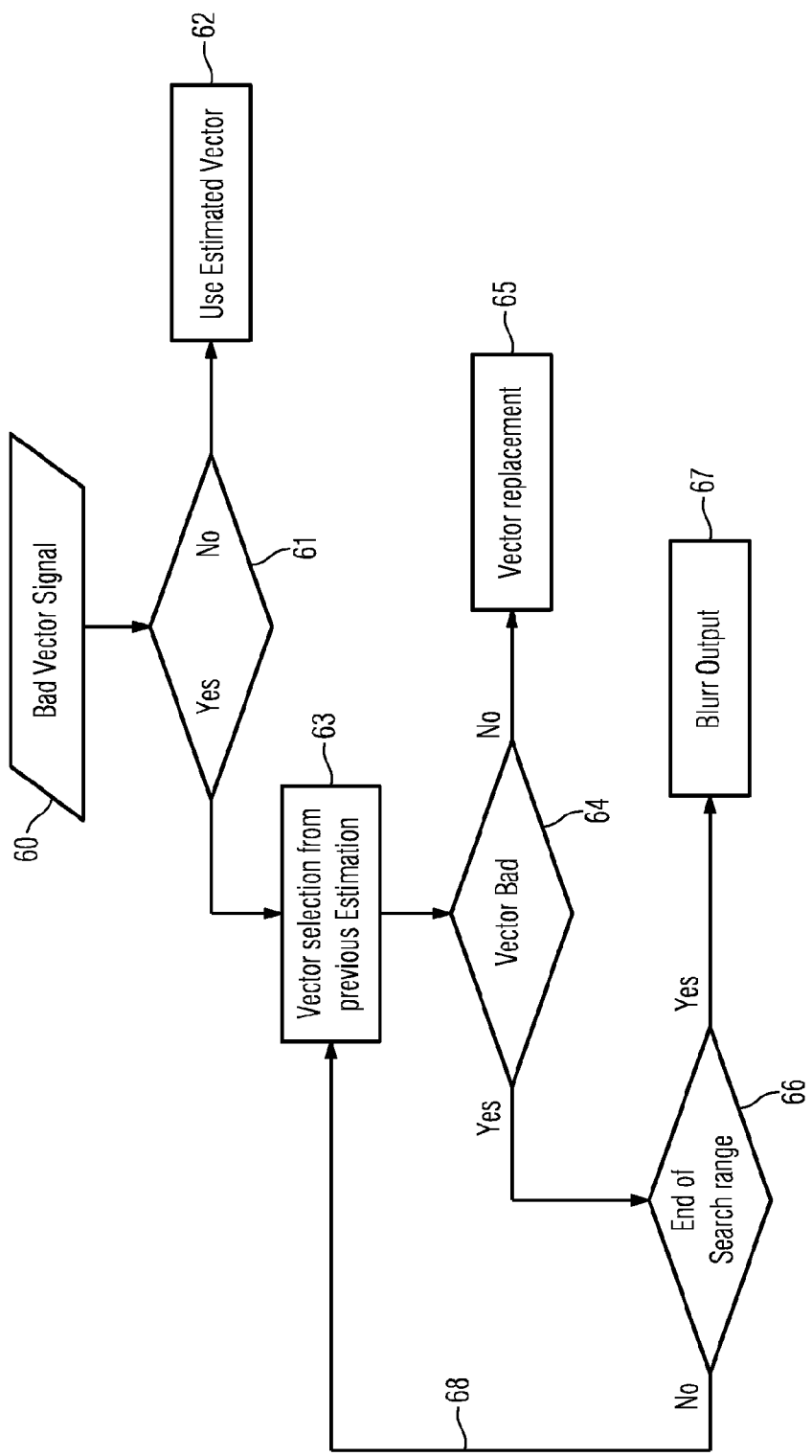
FIG. 8 shows a flow diagram illustrating a search process for bad vector replacement and error concealment according to an embodiment of the present invention.

According to an embodiment of the present invention, replacement of bad vectors or vectors being not reliable for the motion compensation, respectively, is performed to improve the result of the MEMC. FIG. 8 shows an example of a flow diagram to illustrate the search process for a bad vector replacement and error concealment according to this embodiment. In this search process bad motion vectors are treated in a special way in order to avoid introducing artefacts. In case of the occurrence of a bad vector, a reliable vector will be fetched from the memory e. g. for a motion vector for the line above. Therefore, preferably only motion vectors, which are not marked as unreliable, are used in this search process (see description provided above with regard to FIG. 7).

The search process starts e.g. from the most outer border of the search range in order to find a reliable vector of the surrounding area. First, a signal 60 with regard to a motion vector selected for motion compensation is received, wherein the signal indicates whether no bad vector or a reliable vector, respectively, or a bad vector or not reliable vector, respectively, is considered. Thus, in step 61 it is checked whether a bad or no bad vector has been found or detected by the motion estimation process. For this purpose, the quality value or degree, detected for the motion vector in the motion estimation process and indicating whether or not the selected motion vector is reliable for motion compensation, can be used. If the bad vector signal 60 (thus, the quality value or degree) indicates no bad vector or reliable vector, respectively, 61, then this motion vector is used for further processing 62—the further motion estimation process, if needed, and for motion compensation. Otherwise, a new search process 63 is started to select a motion vector by use of results of previous estimation processes. In particular, as already mentioned above, a further motion vector can be searched from the line above the current line used in the motion estimation. Also for this further or new motion vector a corresponding quality value or degree can be detected as already described above (see in particular description of FIG. 7). In step 64, the new motion vector selected by the search process 63 is checked.

If the checking in step 64 shows that the quality value or degree detected for the new motion vector indicates that the new motion vector is a reliable vector (or not bad vector, respectively), then the motion vector, found as being bad or not reliable in step 61, is replaced by the new motion vector in step 65. After replacing the bad vector against the new and reliable vector this reliable vector is then used for the motion compensation process.

However, if the checking in step 64 shows that that the quality value or degree detected for the new motion vector indicates that the new motion vector is not a reliable vector (or bad vector, respectively), then it is checked in step 66 whether the end of the search range is reached. If 66 the end of the search range is reached, the output signal is blurred 67, thus, adaptive blurring 67, as described bellow in more detail, will be performed. If 66 the end of the search range is not yet reached, the search process returns 68 to the step 63.

Figure 9:
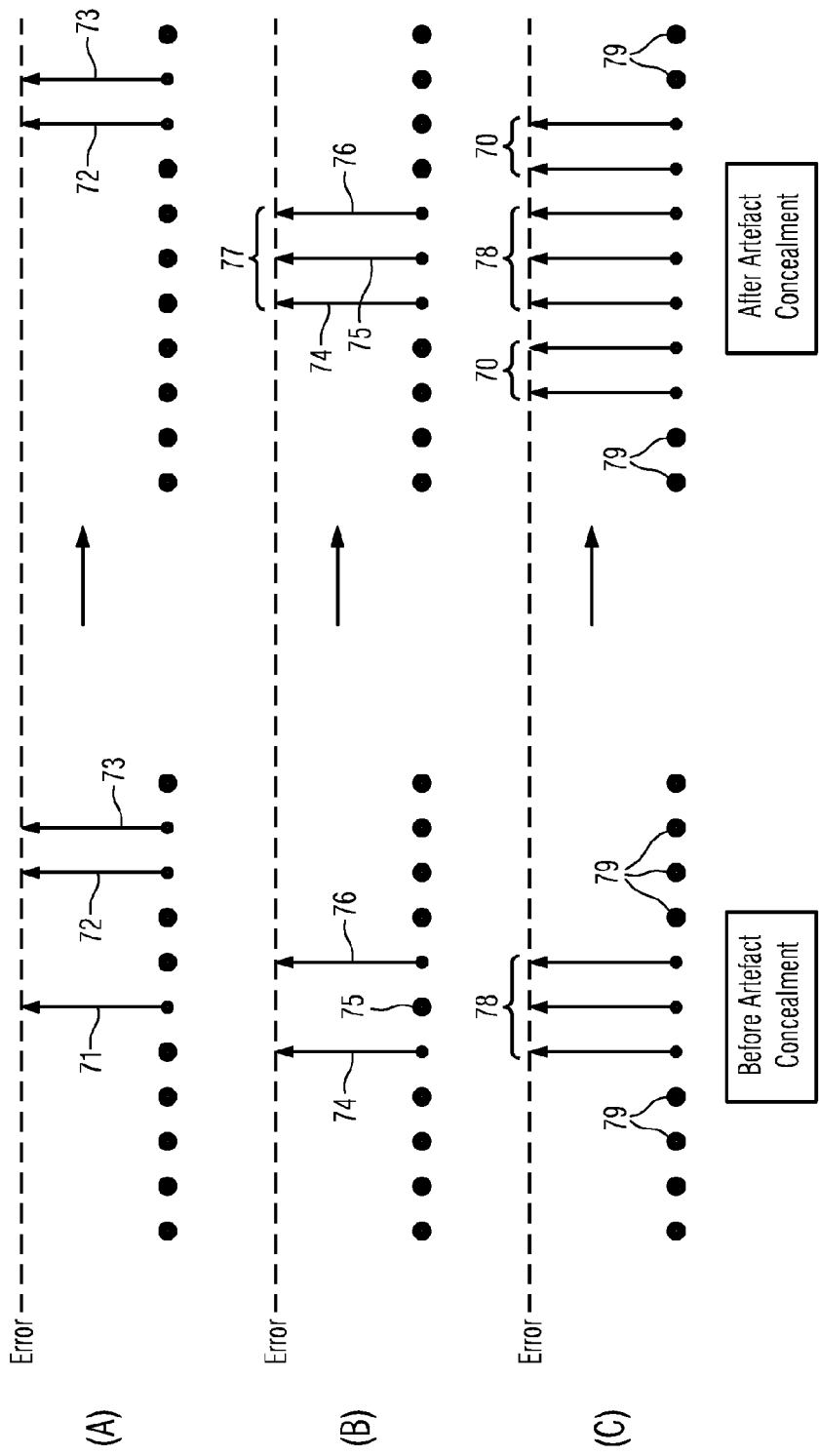
FIG. 9 shows by means of three illustrations (A)-(C) the artefact concealment or adaptive blurring, respectively, according to an embodiment of the present invention.

FIG. 9 shows by means of three illustrations (A)-(C) the artefact concealment or adaptive blurring, respectively, according to an embodiment of the present invention. In particular, adaptive error region extension and error spike suppression are used in the artefact concealment or adaptive blurring, respectively, according to this embodiment of the present invention.

As pointed out with regard to FIG. 8, also when performing bad vector replacement, a set of motion vectors detected by motion estimation can comprise bad or unreliable motion vectors. These remaining unreliable or bad motion vectors have to be used in the motion compensation and lead to artefacts in the interpolated picture. According to the present embodiment, these artefacts are covered by blurring regions of the interpolated picture comprising the artefacts. In order to make efficient artefact concealment, such error regions have to be cleaned up from single spikes. In following, the term spike will be used for a pixel in the interpolated picture, which was interpolated by motion compensation according to a motion vector indicated as not reliable or bad.

According to the present embodiment, single spikes will be suppressed. Double spikes, intersected by a single reliable vector, will be combined as one region.

Further, according to the present embodiment, after this first cleaning up, the remaining error regions will be extended by additional two pixels of bad vectors in front and after the bad error region. This operation ensures a proper behaviour of the blurring filter. The blurring filter only operates horizontally.

In general, in FIGS. 9(A)-(C) the dots represent a line of interpolated image data obtained after performing of the motion compensation by use of motion vectors selected and provided by the motion estimation, wherein each dot of the dots represents a pixel of the interpolated image data. Further, each of the arrows provided in FIGS. 9(A)-(C) starting at a dot or pixel of the line of interpolated image data and leading to a dashed error line indicates that the corresponding pixel has been derived or interpolated, respectively, by use of a bad or not reliable motion vector and represents a spike.

In FIG. 9(A), three spikes 71, 72, 73 are provided. The spike 71 is a single spike and, according to the present embodiment, is suppressed when blurring the corresponding error region of the interpolated image data. Result of this blurring step is shown on the right side of FIG. 9(A), where the spikes 72, 73 only are left.

In FIG. 9(B), the blurring in the error region, comprising the spikes 74, 76, is performed by combining pixels 74, 75, 76 to one uniform region. According to the situation provided in FIG. 9(B), the two spikes 74, 76 are intersected by a motion vector from the set of motion vectors, which is indicated as reliable for motion compensation. This reliable vector has been used for interpolation of the pixel 75. According to the present embodiment, the two spikes 74, 76 and the pixel 75, located between the two spikes 74, 76, are combined to one uniform region 77 during the blurring. Result of this blurring step is shown on the right side of FIG. 9(B).

After a first cleaning up of the interpolated image data as shown by examples of FIGS. 9(A) and 9(B), the remaining error regions are extended by additional two pixels of bad vectors in front and after the bad error region according to the present embodiment. In FIG. 9(C) an error region comprising three neighbouring spikes 78 is provided. Here, this error region 78 is extended by inserting first two pixels 70 in front of the region 78 and by inserting second two pixels 70 after the region 78 in the line of interpolated data. Result of this blurring step is shown on the right side of FIG. 9(C), where the line of interpolated image data comprises the error free neighbour pixels 79, the inserted pixels 70, the error region 78, the inserted pixels 70, and error free neighbour pixels 79.

In this way, an efficient and effective artefact concealment improving the quality of visualisation of data considerably is performed in horizontal direction.

It is self understood that the above mentioned numerical data is merely illustrative and may be adapted to best provide an optimized blurring effect.

Figure 10:
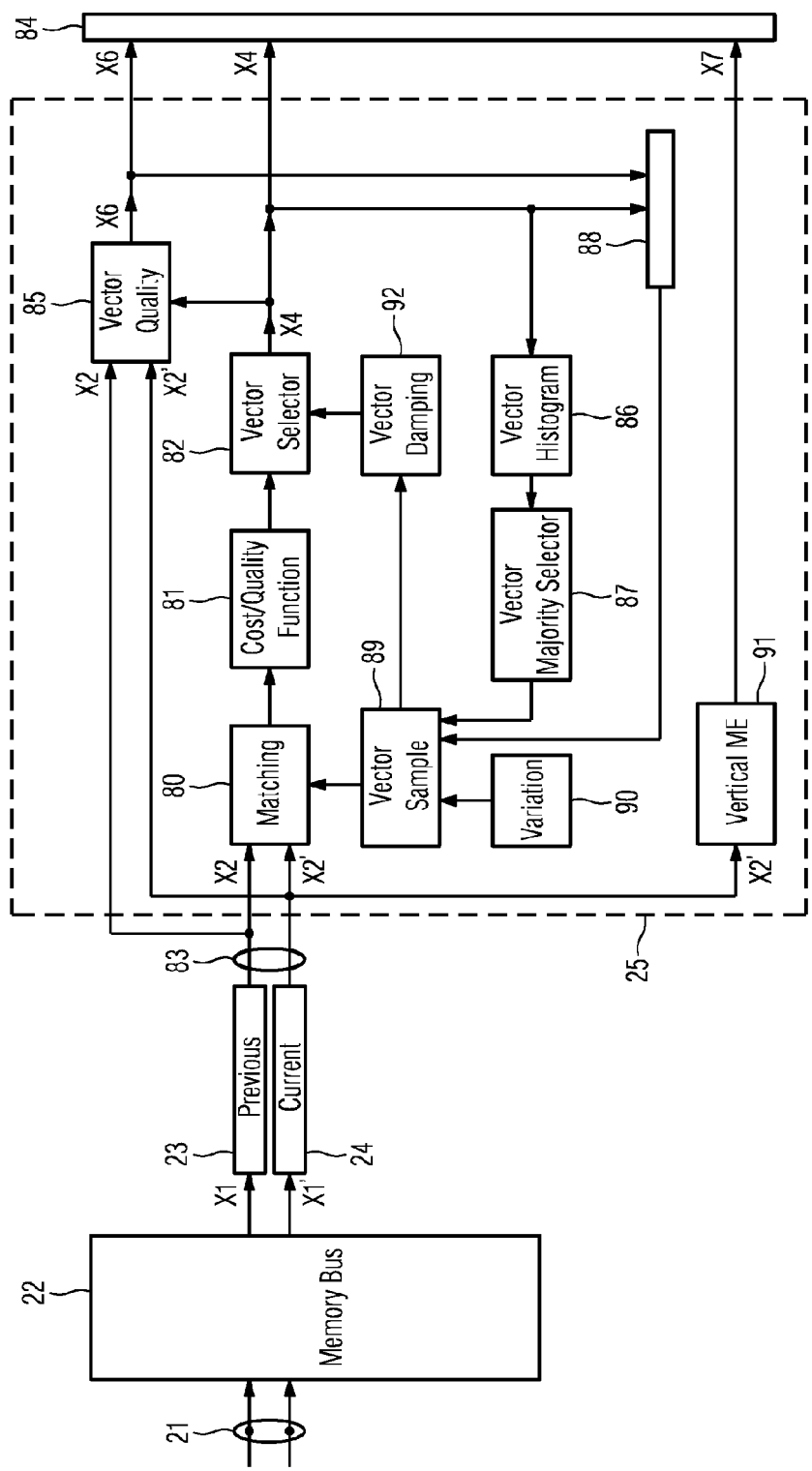
FIG. 10 shows a block diagram illustrating an embodiment of the line-based motion estimation according to the present invention.

FIG. 10 shows a block diagram illustrating an embodiment of the line-based motion estimation according to the present invention as described above and as implemented in a motion estimation device or module 25 as shown in FIG. 4.

The motion estimation device or module 25 comprises a matching device or module 80, a cost/quality function device or module 81 and a vector selector device or module 82, which are arranged in series connection between the input side 83 of the motion estimation device or module 25 where the image data signals X1, X1' stored in the both line memories 23, 24 are provided and the output side 84 of the motion estimation device or module 25 where the motion vector signal X4 in present. In the device or module elements 80-82 a matching process and a vector selection as described with regard to FIG. 5 is implemented.

The motion estimation device or module 25 further comprises a vector quality device or module 85 which is connected on the one hand to the input side 83 and on the other hand to the output side 84. The vector quality device or module 85 generates a quality signal X6 comprising an information of the vector quality out of the image data signals X1, X1' and the motion vector signal X4.

The motion estimation device or module 25 further comprises a vector histogram device or module 86 and a vector majority device or module 87 which are arranged in series connection in a feedback path between the output side 84 and the matching device or module 80. Here, in the device or module elements 86, 87 a vector histogram is generated to provide a ranking of most and less used vectors in the actual scene as shown and described with regard to FIG. 6. Thus, the elements 86, 87 correspond to the vector histogram generator 40 of FIG. 6.

The motion estimation device or module 25 may further comprise a further line memory 88 to store the motion vector data X4 and/or the data X6 for the vector quality.

The motion estimation device or module 25 further comprises a vector sample device or module 89. This vector sample device or module 89 is also arranged in the feedback path and is connected at its input side with the line memory 88, the vector majority device or module 87 and advantageously with a further device or module 90. This further device or module 90 performs a variation of the motion vector samples by using a special signal having a certain magnitude, e.g. a sinusoidal signal, a saw tooth signal or the like. This certain signal is then used for a testing and/or matching process and/or an up-dating process of the first line of a frame or field. However, it might also be possible to randomly up-date different lines of the frame or field. On its output side, the vector sample device or module 89 is connected at its output side to the matching device or module 80.

The motion estimation device or module 25 further comprises a vertical motion estimation device or module 91. For vertical motions the above described one-dimensional motion estimation algorithm is not able to compensate motion in the vertical direction. However, the occurrence of vertical motions can be used to reduce the compensation in same regions of the picture by splitting the picture into different regions to derive vertical motion for each region. In this case the luminance values of the lines in the different region of the same picture will be summed up and stored individually for each line of this picture. This results in an accumulated vertical profile for different regions of the same picture. Then, the whole picture can be divided into smaller regions to derive a vertical motion for each of these regions. This vertical motion estimation process is performed in the vertical motion estimation device or module 91 which is connected to the input side 83 and which provides at its output side a sector based vertical motion index X7.

Thus, the vertical ME as sketched above can be performed independently of horizontal MEMC and also in combination with the horizontal MEMC, wherein the combination can be performed in dependence on a certain situation or the motions present, respectively. Further, such a methodology allows an implementation of vertical ME, which does not need large amounts of additional memory capacity to analyze data of consecutive frames being the case in the most methodologies of the prior art.

The motion estimation device or module 25 further comprises a vector damping device or module 92. In this damping device or module 92 a damping value as described above may be used to damp vector samples of the vector sample device or module 89 and to provide damped vector samples to the vector selector 82.

Figure 11:
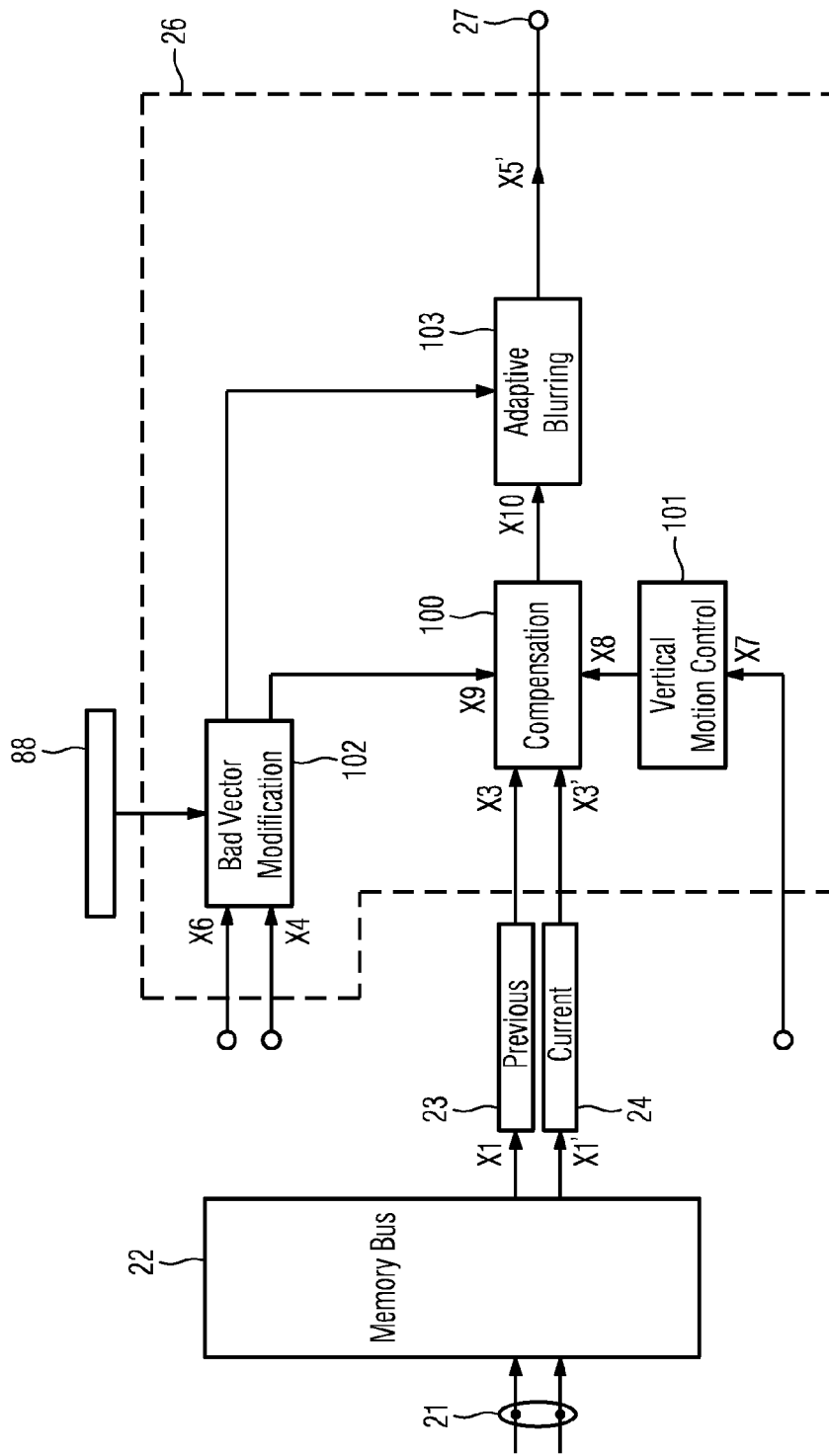
FIG. 11 shows a block diagram illustrating an embodiment of the line-based motion compensation according to the present invention using adaptive artefact concealments.

Hereinafter the motion compensation process which is performed in the motion compensation device or module 26 of FIG. 4 is described with regard to FIG. 11 in more detail. FIG. 11 shows a block diagram illustrating an embodiment of the line-based motion compensation according to the present invention using adaptive artefact concealments as described above.

The motion compensation device or module 26 comprises a compensation device or module 100 which performs the temporal motion interpolation according to the motion vectors X4 estimated by the motion estimation device or module 25. In a preferred embodiment the compensation device or module 100 comprises a Median Filter which uses as input data the luminance values of the vector compensated previous line, the vector compensated current and the uncompensated previous line. Additionally, also the chrominance values can be compensated.

Depending on the vector quality a replacement vector indicated as reliable vector will be searched in the local area of the vector memory from the line above. If no reliable vector could be found, the adaptive blurring, as presented above with regard to FIGS. 9(A)-(C), will be used to cover this artefact.

The motion compensation device or module 26 further comprises a vertical motion control device or module 101 which provides a control signal X8 to the compensation device or module 100 in order to incorporate also information of a vertical motion to the compensation device or module 100.

The motion compensation device or module 26 further comprises a bad vector modification device or module 102. Based on information X4, X6 provided by the motion estimation device or module 25 the bad vector modification device or module 102 modifies bad vectors as shown and described above with regard to FIGS. 8 and 9. This information X9 about modified bad vectors is then used—together with the control signal X8—to perform the motion compensation within the compensation device or module 100. The compensation device or module 100 then generates at its output side a motion compensated image data signal X10.

The motion compensation device or module 26 further comprises an adaptive blurring device or module 103. Based on the motion compensated image data signal X10 and a blurring control signal generated by the bad vector modification device or module 102 this adaptive blurring device or module 103 performs an adaptive blurring e.g. such as described with regard to the FIGS. 8 and 9. The adaptive blurring device or module 103 generates an adaptive blurred image data signal X5' which might correspond to the image signal X5 of FIG. 4.

Figure 12:
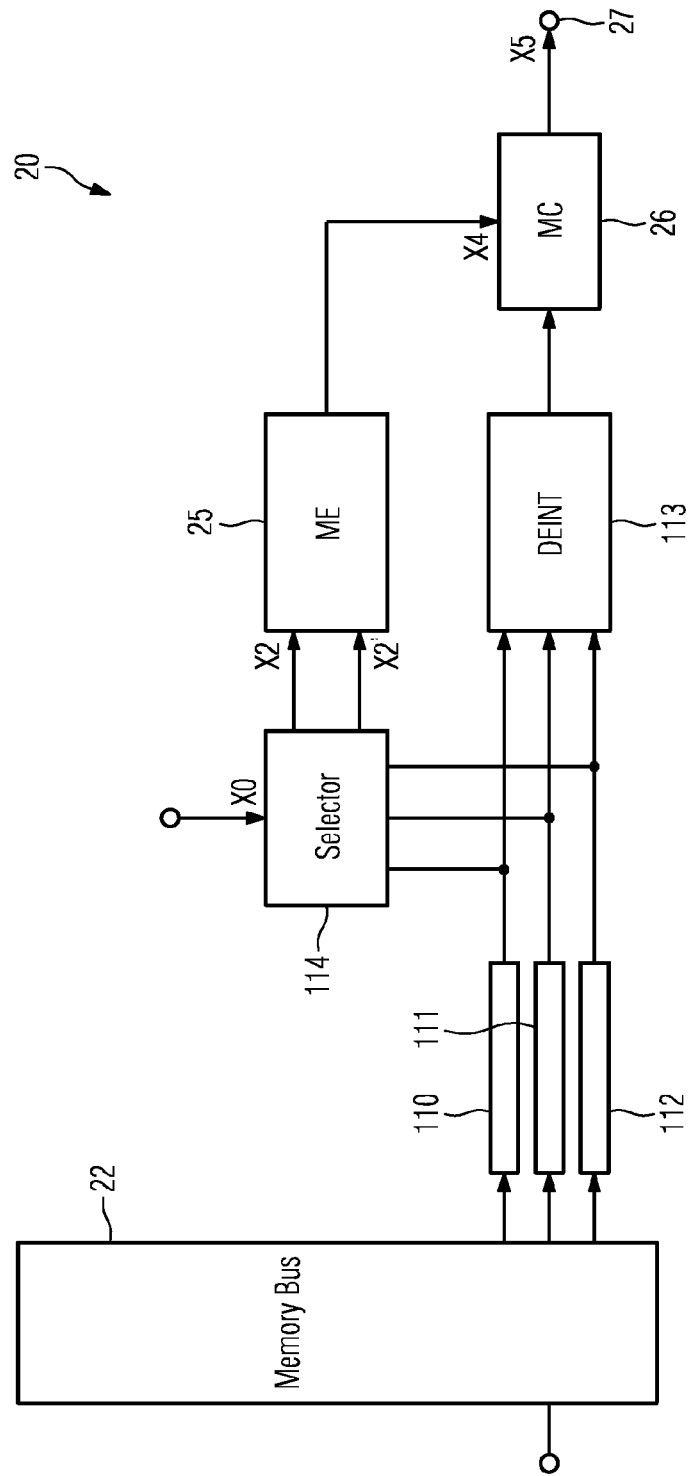
FIG. 12 shows a block diagram of a second embodiment of a line-based MEMC system according to the present invention using the line memories assigned to the de-interlacer device or module also for the motion estimation device or module.

FIG. 12 shows a block diagram of a second embodiment of a line-based MEMC system according to the present invention using the line memories assigned to the de-interlacer device or module also for the motion estimation device.

Unlike the first embodiment in FIG. 4 a de-interlacer device or module 113 is arranged between the line memories 110, 111, 112 and the motion compensation device or module 26. The de-interlacer device or module 113 is typically used to convert a field represented by video data stream into a full frame which is then also represented by another video data stream.

On-chip solutions for video processing which are memory-based have already existing internal line buffers 110-112—the so-called line memories 110-112—which carry video data from the previous and current field or frame. These line buffers 110-112 can be located e. g. within temporal noise reductions or de-interlacing units 113 which operate motion adaptive. With the proposed line-based MEMC these line buffers can be reused additionally for the motion estimation. For that purpose and in order to reduce motion judder artefacts from movie sources, a movie detector which indicates the current interpolated sequence of pull-down mode is used. A line buffer selector transfers the video signal data to the motion estimation device or module according to the previous and the current video input signal. This technique allows using already existing memory resources also for motion estimation which also prevents additional bandwidth for the temporal up-conversion process. Therefore, the chip area for the motion estimation and the motion compensation can be reduced to a minimum.

The de-interlacer device or module 113 uses three line memories 110, 111, 112 coupled on their input side to the memory bus 22 and providing at their output side line data. This line data provided by the line memories 110, 111, 112 is processed within the de-interlacer device or module and then provided to the motion compensation device or module 26. According to the present invention, these line memories 110, 111, 112 are additionally used also for the motion estimation device or module 25. For this purpose, the system 20 additionally comprises a selector device or module 114, where a movie sequence X0 is provided to this selector device or module 114. This movie sequence X0 may be then stored in an external memory 28 via the memory bus 22 and can be read out from this external memory 28 through the line memories 110, 111, and 112. For an IMC operation, this data stored in the line memories 110, 111, 112 of the de-interlacer device or module 113 can be also used for MEMC. For this purpose the data stored in the line memories 110, 111, 112 is then provided as well to the motion estimation device or module 25 and the motion compensation 26 device.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

It is also noted that the above mentioned embodiments, examples and numerical data should be understood to be only exemplary. That means that additional system arrangements and functional units and operation methods and standards may be implemented within the MEMC-system. Further, it has to be noted, that the modules, components, or devices enabling implementation of the present invention and explained above can be configured to be a part of both a system and an apparatus.

REFERENCE LIST 10 current picture (field or frame)
11 previous picture (field or frame)
12 first vector part
13 second vector part
14 missing picture
15 pixels
16 a single line
X1 image data of a previous picture
X1' image data of a current picture
X2 data signal
X2' data signal
X3 image data
X3' image data
X4 vector signal
X5 video signal
20 MEMC system
21 input terminal
22 bus
23 line memory
24 line memory
25 motion estimation device or module
26 motion compensation device or module
27 output terminal
28 external memory
29 display
30 given amount of pixels
31 a centre pixel
32 series of pixels
33 9 single pixels
34 series of nine pixels
35 previous frame
36 horizontal direction
37 a selected motion vector
38 set of (pre-)selected motion vectors 40 vector histogram generator
41 switching device or module
42 incrementing device or module
43 next identical motion vector
44 counter cells
45 counting device or module
46 ranking device or module
47 motion vector histogram memory
50 luminance pixel value
51 luminance pixel value
52 difference
53 adjustable threshold values
54 bad or not reliable vector
55 reliable vector
56 bad vector marking
60 signal
61 checking step
62 further processing
63 search process
64 checking step
65 replacing step
66 checking step
67 blurring step
68 return
70 inserted pixels
71 spike
72 spike
73 spike
74 spike
75 spike
76 spike
77 uniform region
78 neighbouring spikes
79 neighbouring pixels
X6 quality signal
X7 vertical motion index
80 matching device or module
81 cost/quality function device or module
82 vector selector device or module
83 input side
84 output side
85 vector quality device or module
86 element
87 element
88 line memory
89 vector sample device or module
90 further device or module
91 vertical motion estimation device or module
X8 control signal
X9 information
100 compensation device or module
101 vertical motion control device or module
102 bad vector modification device or module
103 adaptive blurring device or module
110 de-interlacer device or module
111 line memory
112 line memory
113 line memory
114 selector device or module

The invention claimed is:

1. A method for line-based motion estimation and line-based motion compensation in video image data, including for motion estimated and compensated field/frame rate up-conversion in consecutive fields/frames of a motion picture, comprising the steps of:
providing a set of motion vectors for the line-based motion compensation in an image data of a current field/frame by performing the line-based motion estimation in a single direction only, wherein the providing of the set of motion vectors comprises dividing the motion picture into horizontal stripes and selecting a most often used vector for each strip;
performing the line-based motion compensation in the single direction only by interpolating the image data of the current field/frame by use of the provided set of motion vectors;
providing an interpolated image data of the image data of the current field/frame as result of the performing of the line-based motion compensation; and
blurring a region of the interpolated image data of the current field/frame if at least one pixel of the region was interpolated according to a motion vector from the set of motion vectors, which is indicated as not reliable for the line-based motion compensation.

2. The method according to claim 1, wherein the blurring comprises a suppressing of the at least one pixel.

3. The method according to claim 1, wherein, if two pixels of the region were interpolated according to motion vectors from the set of motion vectors, which are indicated as not reliable for the line-based motion compensation, and if the motion vectors are intersected by a further motion vector from the set of motion vectors, which is indicated as reliable for the line-based motion compensation, the blurring comprises a combining of pixels between the two pixels and of the two pixels to one uniform region.

4. The method according to claim 1, wherein, if the region consists of more than two neighbouring pixels of the region that were interpolated according to motion vectors from the set of motion vectors, which are indicated as not reliable for the line-based motion compensation, the blurring comprises an extending of the region by inserting first two pixels in front of the region and by inserting second two pixels after the region, wherein the first two pixels and the second two pixels correspond to pixels of motion vectors indicated as not reliable for the line-based motion compensation.

5. The method according to claim 1, wherein a median filter is used for the line-based motion compensation.

6. The method according to the claim 5, wherein the median filter uses as input motion vectors provided for the line-based motion compensation at neighbouring pixels already compensated, motion vectors provided for the line-based motion compensation at neighbouring pixels to be compensated, and a current motion vector provided for a current pixel of the image data of the current field/frame being compensated currently.

7. The method according to claim 1, wherein the line-based motion compensation is performed with regard to at least one of luminance values and chrominance values.

8. The method according to claim 1, wherein the line-based motion estimation is performed in a horizontal direction by use of a line memory comprising the image data of the current field/frame.

9. The method according to claim 1, wherein each motion vector of the set of motion vectors is provided for the line-based motion compensation at a corresponding pixel taken from the image data of the current field/frame.

10. The method according to claim 8, wherein the line-based motion estimation is performed in the horizontal direction by use of a line memory comprising the image data of the current field/frame, wherein the corresponding pixel is taken from the line memory comprising the image data of the current field/frame.

11. The method according to claim 1, wherein the line-based motion estimation is performed in a horizontal direction by use of a line memory comprising image data of a previous field/frame.

12. The method according to claim 1, wherein the line-based motion compensation is performed in a horizontal direction by use of the line memory comprising the image data of the current field/frame.

13. The method according to claim 1, wherein the providing of the set of motion vectors by performing the line-based motion estimation comprises
selecting a motion vector to be used for the line-based motion compensation;
detecting a quality value for the selected motion vector, wherein the quality value indicates if the selected motion vector is reliable for the line-based motion compensation; and
adding the selected motion vector to the set of motion vectors.

14. The method according to claim 1, wherein the providing of the set of motion vectors by performing the line-based motion estimation comprises:
searching for a further motion vector from a line above a current line used in the line-based motion estimation, if the detected quality value indicates that the selected motion vector is not reliable for the line-based motion compensation;
detecting a further quality value for the further motion vector, wherein the further quality value indicates if the further motion vector is reliable for the line-based motion compensation; and
replacing the selected motion vector by the further motion vector if the further quality value indicates the further motion vector as being reliable for the motion compensation.

15. Apparatus for line-based motion estimation and line-based motion compensation in video image data, including motion estimated and compensated field/frame rate up-conversion in consecutive fields/frames of a motion picture, wherein the apparatus comprises:
a module configured to provide a set of motion vectors for the line-based motion compensation in an image data of a current field/frame by performing the line-based motion estimation in a single direction only, wherein the module is configured to divide the motion picture into horizontal stripes and select a most often used vector for each strip;
a module configured to perform the line-based motion compensation in the single direction only by interpolating the image data of the current field/frame according to the provided set of motion vectors and to provide an interpolated image data of the image data of the current field/frame as result of the performing of the line-based motion compensation; and
a module configured to blur a region of the interpolated image data of the current field/frame if at least one pixel of the region was interpolated according to a motion vector from the set of motion vectors, which is indicated as not reliable for the line-based motion compensation.

16. The apparatus according to claim 15, wherein the module configured to blur a region of the interpolated image data of the current field/frame is configured to suppress the at least one pixel.

17. The apparatus according to claim 15, wherein, if two pixels of the region were interpolated according to motion vectors from the set of motion vectors, which are indicated as not reliable for the line-based motion compensation, and if the motion vectors are intersected by a further motion vector from the set of motion vectors, which is indicated as reliable for the line-based motion compensation, the module configured to blur a region of the interpolated image data of the current field/frame is configured to combine pixels between the two pixels and of the two pixels to one uniform region.

18. The apparatus according to claim 15, wherein, if the region consists of more than two neighbouring pixels of the region that were interpolated according to motion vectors from the set of motion vectors, which are indicated as not reliable for the line-based motion compensation, the module configured to blur a region of the interpolated image data of the current field/frame is configured to extend the region by inserting first two pixels in front of the region and by inserting second two pixels after the region, wherein the first two pixels and the second two pixels correspond to pixels of motion vectors indicated as not reliable for the line-based motion compensation.

19. The apparatus according to claim 15, wherein the module configured to perform the line-based motion compensation is configured to use a median filter for the line-based motion compensation.

20. The apparatus according to the claim 19, wherein the median filter is configured to use as input motion vectors provided for the line-based motion compensation at neighbouring pixels already compensated, motion vectors provided for the line-based motion compensation at neighbouring pixels to be compensated, and a current motion vector provided for a current pixel of the image data of the current field/frame being compensated currently.

21. The apparatus according to claim 15, wherein the module configured to perform the line-based motion compensation is configured to perform the line-based motion compensation with regard to at least one of luminance values and chrominance values.

22. The apparatus according to claim 15, wherein the apparatus further comprises a first line memory configured to store the image data of the current field/frame and wherein the line-based motion estimation is performed in a horizontal direction by use of the first line memory.

23. The apparatus according to claim 15, wherein the module configured to provide a set of motion vectors is configured to provide each motion vector of the set of motion vectors at a corresponding pixel taken from the image data of the current field/frame.

24. The apparatus according to claim 22, wherein the corresponding pixel is taken from the first line memory.

25. The apparatus according to claim 22, wherein the line-based motion compensation is performed in a horizontal direction by use of the first line memory.

26. The apparatus according to claim 16, wherein the apparatus further comprises a second line memory configured to store image data of a previous field/frame.

27. The apparatus according to claim 15, wherein the apparatus further comprises a third line memory comprising motion vectors of a line above, wherein the motion vectors of a line above have been provided by a previous performance of the line-based motion estimation for a line above.

28. The apparatus according to claim 15, wherein the module configured to provide a set of motion vectors is configured to:
select a motion vector to be used for the line-based motion compensation;
detect a quality value for the selected motion vector, wherein the quality value indicates if the selected motion vector is reliable for the line-based motion compensation; and add the selected motion vector to the set of motion vectors.

29. The apparatus according to claim 15, wherein the module configured to provide a set of motion vectors is configured to:
   search for a further motion vector from a line above a current line used in the line-based motion estimation, if the detected quality value indicates that the selected motion vector is not reliable for the line-based motion compensation;
   detect a further quality value for the further motion vector, wherein the further quality value indicates if the further motion vector is reliable for the line-based motion compensation; and
   replace the selected motion vector by the further motion vector if the further quality value indicates the further motion vector as being reliable for the motion compensation.

30. A TV-set comprising an apparatus according to claim 15.

31. A non-transitory computer readable medium, wherein a computer program product is embodied on the non-transitory computer readable medium, the computer program product comprising a code that, when executed, implements a method according to claim 1.

32. A system for line-based motion estimation and line-based motion compensation in video image data, including for motion estimated and compensated field/frame rate up-conversion in consecutive fields/frames of a motion picture, wherein the system comprises:
   a module configured to provide a set of motion vectors for the line-based motion compensation in an image data of a current field/frame by performing the line-based motion estimation in a single direction only, wherein the module is configured to divide the motion picture into horizontal stripes and select a most often used vector for each strip;
   a module configured to perform the line-based motion compensation in the single direction only by interpolating the image data of the current field/frame according to the provided set of motion vectors and to provide an interpolated image data of the image data of the current field/frame as result of the performing of the line-based motion compensation; and
   a module configured to blur a region of the interpolated image data of the current field/frame if at least one pixel of the region was interpolated according to a motion vector from the set of motion vectors, which is indicated as not reliable for the line-based motion compensation.

33. The system according to claim 32, wherein the system further comprises a first line memory configured to store the image data of the current field/frame and wherein the line-based motion estimation is performed in a horizontal direction by use of the first line memory.

34. The system according to claim 32, wherein the system further comprises a second line memory configured to store image data of a previous field/frame.

35. The system according to claim 32, wherein the system further comprises a third line memory comprising motion vectors of a line above, wherein the motion vectors of a line above have been provided by a previous performance of the line-based motion estimation for a line above.

36. The method of claim 1, wherein the blurring comprises only horizontally blurring the region of the interpolated image data of the current field/frame.

37. The method of claim 1, wherein the performing the line-based motion compensation is limited to motion in a horizontal direction only.

38. The method of claim 1, wherein the line-based motion estimation and the line-based motion compensation operations are performed using a single line buffer memory.

* * * * *